US007045991B2

(12) United States Patent
Nakamura et al.

(10) Patent No.: US 7,045,991 B2
(45) Date of Patent: May 16, 2006

(54) MAXIMUM POWER FOLLOW-UP CONTROL APPARATUS

(75) Inventors: Kotaro Nakamura, Okayama (JP); Masao Mabuchi, Okayama (JP); Shinichi Hosomi, Okayama (JP); Hironobu Hisashi, Tomisato (JP)

(73) Assignee: Omron Coproration, Kyoto (JP)

( * ) Notice: Subject to any disclaimer, the term of this patent is extended or adjusted under 35 U.S.C. 154(b) by 122 days.

(21) Appl. No.: 10/796,290

(22) Filed: Mar. 10, 2004

(65) Prior Publication Data

US 2004/0245967 A1 Dec. 9, 2004

(30) Foreign Application Priority Data

Mar. 11, 2003 (JP) ............................ 2003-065531

(51) Int. Cl.
*H02P 9/00* (2006.01)
*H02P 9/02* (2006.01)
*F02N 11/08* (2006.01)
*H02K 29/00* (2006.01)
*F03D 7/00* (2006.01)

(52) U.S. Cl. ............................ 322/28; 322/10; 322/17; 322/19

(58) Field of Classification Search ................... 322/28
See application file for complete search history.

(56) References Cited

U.S. PATENT DOCUMENTS 4,707,650 A * 11/1987 Bose .......................... 318/685
4,739,240 A * 4/1988 MacMinn et al. .......... 318/696
4,777,419 A * 10/1988 Obradovic .................. 318/696
4,908,565 A * 3/1990 Cook et al. .................... 322/10
5,012,172 A * 4/1991 Sember ...................... 318/696
5,015,941 A * 5/1991 Dhyanchand ................ 322/10
5,167,660 A * 12/1992 Altendorf ..................... 606/40
5,198,698 A * 3/1993 Paul et al. ...................... 307/64
5,235,503 A * 8/1993 Stemmler et al. ............. 363/37
5,301,098 A * 4/1994 Dhyanchand et al. ......... 363/97
5,526,448 A * 6/1996 Nagata et al. ................. 385/1
5,646,510 A * 7/1997 Kumar ........................ 322/16
5,869,956 A * 2/1999 Nagao et al. ............... 323/299

(Continued)

FOREIGN PATENT DOCUMENTS

EP 0 947 904 A2 10/1999

(Continued)

OTHER PUBLICATIONS

Patent Abstracts of Japan, JP 08/123561, May 17, 1996, abstract only.

(Continued)

*Primary Examiner*—Darren Schuberg
*Assistant Examiner*—Pedro J. Cuevas
(74) *Attorney, Agent, or Firm*—Foley & Lardner LLP

(57) ABSTRACT

A power conditioner 10 is provided with a maximum power follow-up control portion 12 for setting a DC operating voltage of a power converter 11, which converts output power of a power generator 2 into AC power, for making a power point corresponding to the output level of the power generator follow up with a maximum power point, and comprises an approximate function memory 25 for storing approximate functions related to the maximum power point, a follow-up control portion 34 for making the present power point reach proximate of the maximum power point on the basis of the approximate function, and a hill-climbing method follow-up control portion 35 for making the present power point reach the maximum power point by using a hill-climbing method when the present power point has reached proximate of the maximum power point.

14 Claims, 17 Drawing Sheets

U.S. PATENT DOCUMENTS

| | | | | |
|---|---|---|---|---|
| 5,892,354 | A | 4/1999 | Nagao et al. | 323/299 |
| 5,992,950 | A * | 11/1999 | Kumar et al. | 303/151 |
| 5,998,880 | A * | 12/1999 | Kumar | 290/40 B |
| 6,043,995 | A * | 3/2000 | Leuthen | 363/37 |
| 6,087,791 | A * | 7/2000 | Maruyama | 318/140 |
| 6,175,217 | B1 * | 1/2001 | Da Ponte et al. | 322/19 |
| 6,282,104 | B1 * | 8/2001 | Kern | 363/34 |
| 6,304,467 | B1 * | 10/2001 | Nebrigic | 363/49 |
| 6,315,381 | B1 * | 11/2001 | Wade et al. | 347/19 |
| 6,326,756 | B1 * | 12/2001 | Youn | 318/569 |
| 6,556,718 | B1 * | 4/2003 | Piccinelli et al. | 382/236 |
| 6,686,718 | B1 * | 2/2004 | Jadric et al. | 318/801 |
| 6,788,027 | B1 * | 9/2004 | Malik | 320/134 |
| 6,801,019 | B1 * | 10/2004 | Haydock et al. | 322/17 |

FOREIGN PATENT DOCUMENTS

| | | | |
|---|---|---|---|
| JP | 62274175 | A * | 11/1987 |
| JP | P09-131081 | | 5/1997 |
| JP | 10051945 | A * | 2/1998 |
| JP | 10-83223 | | 3/1998 |
| JP | 10301983 | A * | 11/1998 |
| JP | 11121145 | A * | 4/1999 |
| JP | 2000-181555 | A | 6/2000 |
| JP | P2002-108466 | | 4/2002 |
| JP | 2003324735 | A * | 11/2003 |
| WO | WO 03/012569 | A1 | 2/2003 |
| WO | WO 2004095350 | A2 * | 11/2004 |

OTHER PUBLICATIONS

J. Fox, "SAS Textbook Examples: Applied Regression Analysis" Online! Aug. 17, 2000. URL:http://web.archive.org/web/20000817051835/http://www.ats.ucla.edu/stat/sas/examples/ara/arasas2.htm>, XP002296821.

F. Hoti, Kernal Regression via Binned Data, Online! Feb. 1, 2001, URL:http://www.rni.helsinki.fi/(fih/lisuri.pdf>, XP002296820.

De Medeiros Torres, et al., "An Artificial Neural Network-Based Real Time Maximum Power Tracking Controller for Connecting a PV System to the Grid," Industrial Electronics Soc, 1998, Conf. of IEEE, pp. 554-558, XP010308158.

N. Patcharaprakiti et al., "Maximum Power Point Tracking Using Adaptive Fuzzy Logic Control for Grid-Connected Photovoltaic System," 2002 IEEE Power Eng. Soc. Proceedings, pp. 372-377.

Japanese Examination Report dated Dec. 9, 2003.

* cited by examiner

MAXIMUM POWER FOLLOW-UP CONTROL APPARATUS

BACKGROUND OF THE INVENTION

1. Field of the Invention

The present invention relates to a maximum power follow-up control apparatus, wherein in a dispersive power generation system including a power generator for generating DC power, such as a hydraulic power generator or a wind power generator, and a power conditioning device (hereinafter simply referred to as "power conditioner") for converting the DC power from the power generator into AC power and for supplying the converted AC power to a system or the like, optimal power generation efficiency corresponding to output characteristics of the power generator can be obtained in the interior of the power conditioner.

2. Description of the Prior Art

Generally, various systems such as a hydraulic power generation system, a wind power generation system, a solar power generation system or a fuel engine power generation system are suggested as a dispersive power generation system.

Such a dispersive power generation system is arranged in that DC power generated in a power generator is converted into AC power in a power converter within a power conditioner and in that the AC power is supplied to loads of consumer electronics or to systems of commercial power sources.

For improving the power generation efficiency of such a dispersive power generation system, many kinds of maximum power follow-up control apparatuses have been proposed that are based on a relationship between output power of a power generator and a DC operating voltage of a power converter within the power conditioner, that is, an output voltage of the power generator, wherein the DC operating voltage is adjusted to rapidly make a power point of output power of the power generator follow up with a maximum power point.

FIG. 15 is an explanatory view illustrating characteristics (V-P characteristics) of DC power and DC voltage in a general solar power generator.

While characteristics will be mountain-shaped in a solar power generator as illustrated in FIG. 15, by controlling the DC operating voltage of the power converter such that the power point will reach the peak of the mountain shape, that is, the maximum power point, it is possible to maximize the power generation efficiency of the solar power generator.

However, the V-P characteristics will fluctuate depending on changes in illumination of sunlight in a solar power generator, and the maximum power point will also change in accordance with the changes in illumination.

It is therefore known for conventional maximum power follow-up control apparatuses employing a hill-climbing method (see, for instance, Japanese Patent Laid-Open Publication No. 2000-181555). FIG. 16 is an explanatory view illustrating an operation algorithm of a general hill-climbing method in a simple form.

According to the conventional maximum power follow-up control apparatus of Japanese Patent Laid-Open Publication No. 2000-181555, a DC operating voltage of a power converter is adjusted per each specified voltage $\Delta V$ and output powers of solar batteries prior to and after adjustment are mutually compared, wherein when the output power has increased, the DC operating voltage is changed by a specified voltage $\Delta V$ in the same direction as the previous time while it is changed by a specified voltage $\Delta V$ in an opposite direction as the previous time for making a power point of the output power reach a maximum power point Pmax in accordance with the changes in DC operating voltages, and wherein the DC operating voltage at the time of reaching is obtained as an optimal value.

According to this maximum power follow-up control apparatus, the power point will reach a maximum power point by setting the thus obtained DC operating voltage for the power converter so that the power generation efficiency of the solar batteries can be maximized.

In this respect, such V-P characteristics also differ depending on the types of the power generator. FIG. 17 is an explanatory view illustrating V-P characteristics of a power generator of dynamic type, and FIG. 18 illustrating V-P characteristics of a hydraulic power generator from among dynamic type power generators.

In this manner, the V-P characteristics of the power generators also differ depending on the types of power generators as can be understood by comparing the V-P characteristics of the solar power generator of FIG. 15 and V-P characteristics of the power generators as illustrated in FIGS. 17 and 18.

Generally, in case of a solar power generator, the V-P characteristics are fluctuated depending on changes in illumination of the sunlight as illustrated in FIG. 19A, while in case of a dynamic type power generator, V-P characteristics are fluctuated depending on changes in dynamics (that is, changes in water volume in case of a hydraulic power generator, changes in wind power in case of a wind power generator, or changes in gas volume in case of a gas engine power generator) as illustrated in FIG. 19B.

When comparing the V-P characteristics of a solar power generator and V-P characteristics of a dynamic type power generator, it can be understood that voltage changes of maximum power points depending on changes in illumination are relatively small in case of a solar power generator as illustrated in FIG. 19A, while the voltage changes of maximum power points depending on changes in dynamics are relatively large in case of a dynamic type power generator as illustrated in FIG. 19B.

Considering a conventional maximum power follow-up control apparatus, in case of a solar power generator, a period of time for making the power point reach the maximum power point by using the hill-climbing method will not too long to badly affect the power generation efficiency although it will take some time since the voltage changes of maximum power points depending on changes in illumination are relatively small as illustrated in FIG. 19A, whereas in case of, for instance, a dynamic type power generator, it will take a long period of time until the power point is made to reach the maximum power point through a conventional hill-climbing method only in which the follow-up speed is slow since the voltage changes of maximum power points depending on changes in dynamics are relatively large as illustrated in FIG. 19B so that it is feared that the power generation efficiency during this period is badly affected.

SUMMARY OF THE INVENTION

The present invention has been made in view of these points, and it is an object to provide a maximum power follow-up control apparatus that is capable of making a power point of a power generator such as a dynamic type power generator in which voltage changes of maximum power points depending on changes in dynamics are large rapidly follow up with a maximum power point so that its power generation efficiency can be made favorable.

For achieving this object, the maximum power follow-up control apparatus according to the present invention is a maximum power follow-up control apparatus for setting an operating voltage of a power converter that which converts an output voltage of a power generator into AC power so as to make a power point of an output power of the power generator, which corresponds to an output level of the power generator, follow up with a maximum power point, and comprises: an approximate function storing part that stores an approximate function related to a maximum power point corresponding to the output level of the power generator of characteristics of the output power and the operating voltage, and a control part that calculates an operating voltage value corresponding to the present output power on the basis of the approximate function as stored in the approximate function storing part and that sets this operating voltage value as an operating voltage value of the power converter in order to make the power point related to the output power in correspondence with the output level of the power generator follow up with the maximum power point.

Accordingly, the maximum power follow-up control apparatus of the present invention is arranged in that an approximate function related to a maximum power point corresponding to the output level of the power generator of characteristics of the output power and the operating voltage is stored, an operating voltage value corresponding to the present output power on the basis of the approximate function is calculated and this operating voltage value is set as an operating voltage value of the power converter in order to make the power point related to the output voltage in correspondence with the output level of the power generator follow up with the maximum power point. With this arrangement of using an approximate function, the follow-up time for making the power point reach proximate of the maximum power point can be remarkably shortened so that follow-up to the maximum power point can be rapidly performed also when the power generator is a dynamic type power generator or the like in which changes in maximum power points with respect to changes in dynamics are large, and it is accordingly possible to improve the power generation efficiency.

According to the maximum power follow-up control apparatus of the present invention, the control part includes a voltage value calculating part that calculates an operating voltage value corresponding to the present output power of the power generator on the basis of the approximate function, a voltage value setting part that sets the operating voltage value as calculated by the voltage value calculating part as an operating voltage value of the power converter, and a judging part that calculates an operating voltage value corresponding to the present output power in the voltage value calculating part upon setting the operating voltage value in the voltage value setting part and that judges whether an absolute value of a difference between the calculated operating voltage value and the present operating voltage value is within a specified threshold or not, wherein when it is judged by the judging part that the absolute value of the difference between the operating voltage values is within the specified threshold, it is recognized that the power point related to the output power that corresponds to the output level of the power generator has reached proximate of the maximum power point.

Accordingly, the maximum power follow-up control apparatus of the present invention is arranged in that when an operating voltage value is set in the voltage value setting part, an operating voltage value corresponding to the present output power of the power generator is calculated on the basis of the approximate function, and it is judged whether an absolute value of a difference between the calculated operating voltage value and the present operating voltage value is within a specified threshold or not, wherein when it is judged that the absolute value of the difference between the operating voltage values is within the specified threshold, it is recognized that the power point related to the output power that corresponds to the output level of the power generator has reached proximate of the maximum power point. With this arrangement of using an approximate function, the follow-up time for making the power point reach proximate of the maximum power point can be remarkably shortened so that follow-up to the maximum power point can be rapidly performed also when the power generator is a dynamic type power generator or the like in which changes in maximum power points with respect to changes in dynamics are large, and it is accordingly possible to improve the power generation efficiency.

According to the maximum power follow-up control apparatus of the present invention, the control part is arranged in that the operating voltage value of the power converter is set to make the power point related to the output power of the power generator reach the maximum power point by utilizing a hill-climbing method for maximum power follow-up control when it has been recognized that the power point related to the output power that corresponds to the output level of the power generator has reached proximate of the maximum power point.

Accordingly, the maximum power follow-up control apparatus of the present invention is arranged in that the operating voltage value of the power converter is set to make the power point related to the output power of the power generator reach the maximum power point by utilizing a hill-climbing method for maximum power follow-up control when it has been recognized that the power point related to the output power that corresponds to the output level of the power generator has reached proximate of the maximum power point. With this arrangement, it is possible to improve the follow-up accuracy to the maximum power point by using the hill-climbing method for the follow-up operations from proximate of the maximum power point to the maximum power point.

According to the maximum power follow-up control apparatus of the present invention, the control part is arranged in that, when it is judged by the judging part that the absolute value of the difference between the operating voltage values is not within the specified threshold, the operating voltage value is calculated in the voltage value calculating part, the calculated operating voltage value is set in the voltage value setting part, and operations of the voltage value calculating part, the voltage value setting part and the judging part are continued until the absolute value of the difference between the operating voltage values falls within the specified threshold in the judging part.

Accordingly, the maximum power follow-up control apparatus of the present invention is arranged in that, when it is judged by the judging part that the absolute value of the difference between the operating voltage values is not within the specified threshold, operations of the voltage value calculating part, the voltage value setting part and the judging part are continued until the absolute value of the difference between the operating voltage values falls within the specified threshold. With this arrangement, it is possible to rapidly follow up to proximate of the maximum power point.

According to the maximum power follow-up control apparatus of the present invention, it comprises a first approximate function creating part that detects a maximum power point for each output level of the power generator and that creates the approximate function on the basis of at least two maximum power points.

Accordingly, the maximum power follow-up control apparatus of the present invention is arranged in that a maximum power point is detected for each output level of the power generator and in that the approximate function is created on the basis of at least two maximum power points. With this arrangement, it is possible to easily create an approximate function and to further create an approximate function of high accuracy by increasing the number of samples of maximum power points.

According to the maximum power follow-up control apparatus of the present invention, the first approximate function creating part detects the maximum power point of each output level of the power generator by utilizing a hill-climbing method for maximum power follow-up control.

Accordingly, the maximum power follow-up control apparatus of the present invention is arranged in that the maximum power point for creating an approximate function is detected through the hill-climbing method, it is possible to create an approximate function of high accuracy.

According to the maximum power follow-up control apparatus of the present invention, it comprises an abnormality noticing part that notices an abnormality of the power generator when it is judged that the approximate function created in the first approximate function creating part is abnormal.

Accordingly, the maximum power follow-up control apparatus of the present invention is arranged in that abnormality of the power generator is noticed when it is judged that the approximate function created in the first approximate function creating part is abnormal, for instance, when the slope of the approximate function is reversed. With this arrangement, it is possible to notice the user of an abnormality of the power generator or of the approximate function.

According to the maximum power follow-up control apparatus of the present invention, it comprises a second approximate function creating part that separates, by dividing the output power into a plurality of level regions and by sequentially detecting power points, the detected plurality of power points into respective level regions, that calculates average values of the plurality of power points separated into respective level regions for setting the average values of each of the level regions as maximum power points, and that creates the approximate function on the basis of the maximum power points for each of the level regions.

Accordingly, the maximum power follow-up control apparatus of the present invention is arranged in that the output power is divided into a plurality of level regions and average values of the plurality of power points separated into respective level regions are set as maximum power points, and in that the approximate function is created on the basis of the maximum power points for each of the level regions. With this arrangement, a plurality of power points, that is, a large number of samples can be obtained, and by averaging the number of samples, it is possible to create an approximate function of high accuracy corresponding to changes in external environments.

The maximum power follow-up control apparatus according to the present invention is arranged in that the second approximate function creating part detects the power points by utilizing a hill-climbing method for maximum power follow-up control.

Accordingly, the maximum power follow-up control apparatus of the present invention is arranged in that the maximum power points for creating an approximate function are detected by utilizing the hill-climbing method so that it is possible to create an approximate function of high accuracy.

According to the maximum power follow-up control apparatus of the present invention, it comprises an abnormality noticing part that notices an abnormality of the power generator when it is judged that the approximate function created in the second approximate function creating part is abnormal.

Accordingly, the maximum power follow-up control apparatus of the present invention is arranged in that abnormality of the power generator is noticed when it is judged that the that the approximate function as created in the second approximate function creating part is abnormal, for instance, when the slope of the approximate function is abnormal. With this arrangement, it is possible to notice the user of an abnormality of the power generator or of the approximate function.

According to the maximum power follow-up control apparatus of the present invention, the approximate function storing part is arranged to preliminarily store approximate functions corresponding to types of the power generator.

Accordingly, the maximum power follow-up control apparatus of the present invention is arranged in that approximate functions corresponding to types of the power generator are preliminarily stored so that it is possible to correspond to various power generators.

According to the maximum power follow-up control apparatus of the present invention, it comprises a first approximate function correcting part that detects a maximum power point for each output level of the power generator by using a hill-climbing method for maximum power follow-up control and that corrects the approximate functions as stored to correspond to each type of the power generator on the basis of the detected maximum power point.

Accordingly, the maximum power follow-up control apparatus of the present invention is arranged in that a maximum power point is detected by using the hill-climbing method and in that the approximate functions as stored to correspond to each type of the power generator are corrected on the basis of the detected maximum power point. With this arrangement, it is possible to create an approximate function of high accuracy corresponding to various changes in dynamics of the power generator and changes in illumination.

According to the maximum power follow-up control apparatus of the present invention, it comprises a second approximate function correcting part that detects a maximum power point for each output level of the power generator by using a hill-climbing method for maximum power follow-up control when it has been recognized that the power point related to the output power that corresponds to the output level of the power generator has reached proximate of the maximum power point, and that corrects the approximate functions as being stored in the approximate function storing part on the basis of the detected maximum power points.

Accordingly, the maximum power follow-up control apparatus of the present invention is arranged in that the maximum power point is detected by using the hill-climbing method and in that the approximate functions as being stored in the approximate function storing part are corrected on the basis of the detected maximum power point when it has been recognized that the power point has reached proximate of the maximum power point. With this arrangement, it is possible to continuously secure an approximate function of high accuracy corresponding to various changes in dynamics of the power generator, and changes in illumination.

According to the maximum power follow-up control apparatus of the present invention, it comprises a third approximate function correcting part that executes follow-up operations to the maximum power point by using a hill-climbing method for maximum power follow-up control when it has been recognized that the power point related to the output power that corresponds to the output level of the power generator has reached proximate of the maximum power point, and that corrects only an intercept of the approximate function without changing its slope on the basis of the power point as detected by the follow-up operation.

Accordingly, the maximum power follow-up control apparatus of the present invention is arranged in that follow-up operations to the maximum power point are executed by using the hill-climbing method when it has been recognized that the power point has reached proximate of the maximum power point, and only an intercept of the approximate function is corrected without changing its slope on the basis of the power point as detected by the follow-up operation. With this arrangement, it is possible to finely adjust errors in the approximate function.

DESCRIPTION OF THE PREFERRED EMBODIMENTS

A dispersive power generation system illustrating embodiments related to the maximum power follow-up control apparatus according to the present invention will now be explained on the basis of the drawings.

First Embodiment

Figure 1:
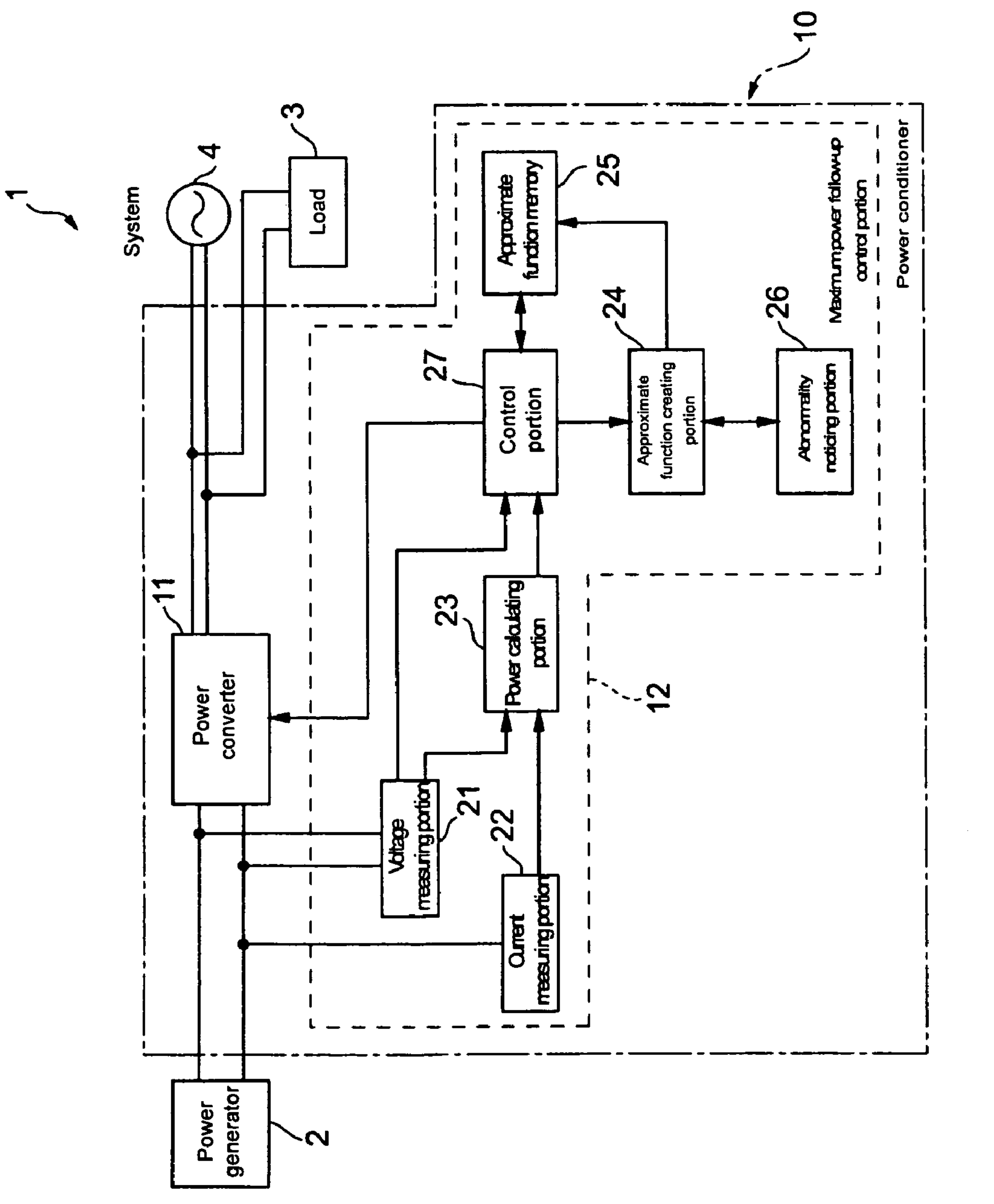
FIG. 1 shows a block view illustrating a schematic arrangement of an interior of a dispersive power generation system representing a first embodiment related to the maximum power follow-up control apparatus of the present invention.

FIG. 1 is a block view illustrating a schematic arrangement of an interior of the dispersive power generation system representing the first embodiment.

The dispersive power generation system 1 as illustrated in FIG. 1 includes a power generator 2 for generating DC power, a power conditioner 10 provided with power converting functions of converting DC power generated in the power generator 2 into AC power, a load 3 of, for instance, a consumer electronics that is driven by the DC power converted in the power conditioner 10, and a system 4 such as a commercial power source for supplying excessive DC power to the load 3. In this respect, while the load 3 is supplied with power from the power conditioner 10, where the output power of the power conditioner 10 is less than the driving power of the load 3, the load 3 is supplied with power from the system 4 in addition to the power supply from the power conditioner 10.

The power conditioner 10 as illustrated in FIG. 1 includes a power converter 11 for converting DC power generated in the power generator 2 into AC power, and a maximum power follow-up control portion 12 for making a power point of the output power of the power generator 2 rapidly follow up with a maximum power point by controlling the DC operating voltage of the power converter 11.

The maximum power follow-up control portion 12 includes a voltage measuring portion 21 for measuring the DC voltage from the power generator 2, a current measuring portion 22 for measuring a direct current from the power generator 2, a power calculating portion 23 for calculating a DC power on the basis of the DC voltage measured in the voltage measuring portion 21 and the direct current measured in the current measuring portion 22, an approximate function creating portion 24 for creating an approximate function related to a maximum power point corresponding to an output level of the V-P characteristics, an approximate function memory 25 for storing the approximate function as created in the approximate function creating portion 24, an abnormality noticing portion 26 for noticing abnormality when it is judged that the approximate function created in the approximate function creating portion 24 is abnormal, and a control portion 27 for controlling the overall maximum power follow-up control portion 12.

In this respect, the approximate function memory 25 may be arranged to be preliminarily stored, in addition to approximate functions that are created in the approximate function creating portion 24, with approximate functions for various types of the power generator 2.

The abnormality noticing portion 26 determines, when an abnormality has occurred in an approximate function that has been created in the approximate function creating portion 24, for instance, when the slope of the approximate function is reversed, that this approximate function is abnormal and notices occurrence of this abnormality to an user.

Figure 2:
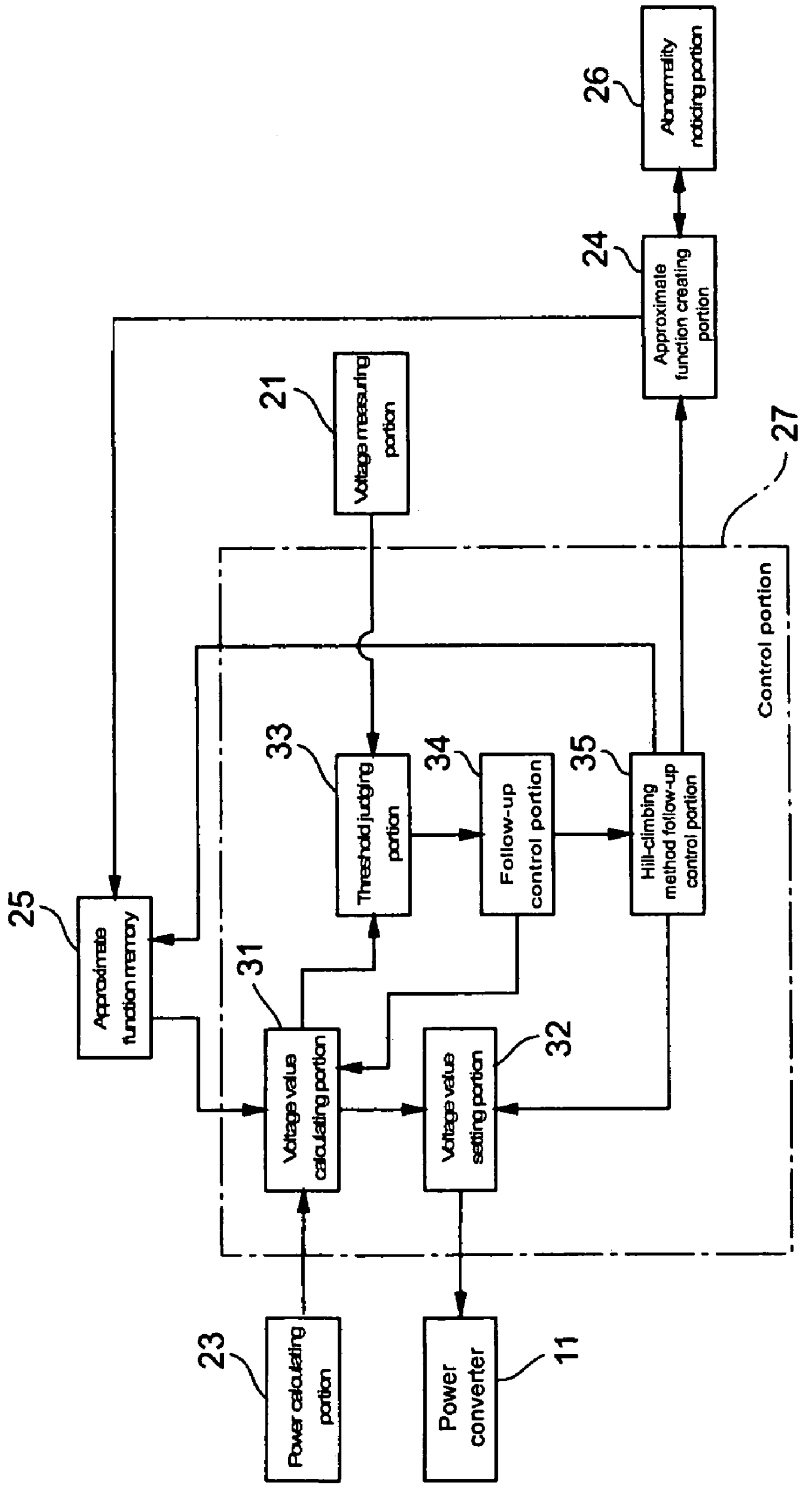
FIG. 2 shows a block view illustrating a schematic arrangement of an interior of a control portion, which comprises a main portion of a maximum power follow-up control portion of a power conditioner related to the first embodiment.

FIG. 2 is a block view illustrating a schematic structure of an interior of the control portion that comprises a main portion of a maximum power follow-up control portion 12.

The control portion 27 includes a voltage value calculating portion 31 that calculates a DC voltage value by substituting a present DC power value to an approximate function stored in the approximate function memory 25, a voltage value setting portion 32 that sets the DC voltage value as calculated in the voltage value calculating portion 31 as an operating voltage of the power converter 11, a threshold judging portion 33 that calculates a DC voltage value corresponding to the present DC power in the voltage value calculating portion 31 upon setting a DC voltage value in the voltage value setting portion 32 and that judges whether an absolute value of a difference between the calculated DC voltage value and the present DC voltage value is within a DC voltage threshold, a follow-up control portion 34 that governs maximum power follow-up functions by using an approximate function for making a power point of the DC power corresponding to the output level of the power generator 2 to proximate of a maximum power point, and a hill-climbing method follow-up control portion 35 that governs maximum power follow-up functions by using a hill-climbing method.

The threshold judging portion 33 is for judging whether the present power point has reached proximate of a maximum power point, and when it is judged that an absolute value of a difference between a DC voltage value Vthe as calculated in the voltage value calculating portion 31 and the present DC voltage value Vmes as measured in the voltage measuring portion 21 is within a DC voltage threshold Vthr, it is recognized that the present power point has reached proximate of the maximum power point whereas when it is judged that the absolute value of the difference between the DC voltage value Vthe and the present DC voltage value Vmes is not within the DC voltage threshold Vthr, it is recognized that the present power point has not reached proximate of the maximum power point.

The follow-up control portion 34 switches to maximum power follow-up operations using the hill-climbing method when it is recognized in the threshold judging portion 33 that the present power point has reached proximate of the maximum power point, whereas the maximum power follow-up operations based on an approximate function are continued when it is recognized in the threshold judging portion 33 that the present power point has not reached proximate of the maximum power point.

In other words, the follow-up control portion 34 continues maximum power follow-up operations based on an approximate function until the present power point has reached proximate of the maximum power point.

When the present power point has reached proximate of the maximum power point in the follow-up control portion 34, the hill-climbing method follow-up control portion 35 starts maximum power follow-up operations by using the hill-climbing method for continuing maximum power follow-up operations so as to make the present power point follow up from proximate of the maximum power point to the maximum power point by using the hill-climbing method.

In this respect, when the power point has again separated from proximate of the maximum power point after executing maximum power follow-up operations by using the hill-climbing method due to, for instance, changes in external environments of the power generator 2, maximum power follow-up operations by using approximate functions are repeatedly executed by the follow-up control portion 34 until the proximity of the maximum power point is reached.

Further, the hill-climbing method follow-up control portion 35 executes maximum power follow-up operations of hill-climbing method also for detecting a plurality of maximum power points when an approximate function is created in the approximate function creating portion 34.

In this respect, the maximum power follow-up control apparatus as recited in the claims corresponds to the maximum power follow-up control portion 12 within the power conditioner 10, the approximate function storing part to the approximate function memory 25, the control part to the control portion 27 (follow-up control portion 34, hill-climbing method follow-up control portion 35), the voltage value calculating part to the voltage value calculating portion 31, the voltage value setting part to the voltage value setting portion 32, the judging part to the threshold judging portion 33, the first approximate function creating part and the second approximate function creating part to the approximate function creating portion 24, and the abnormality noticing part to the abnormality noticing portion 26.

Figure 3:
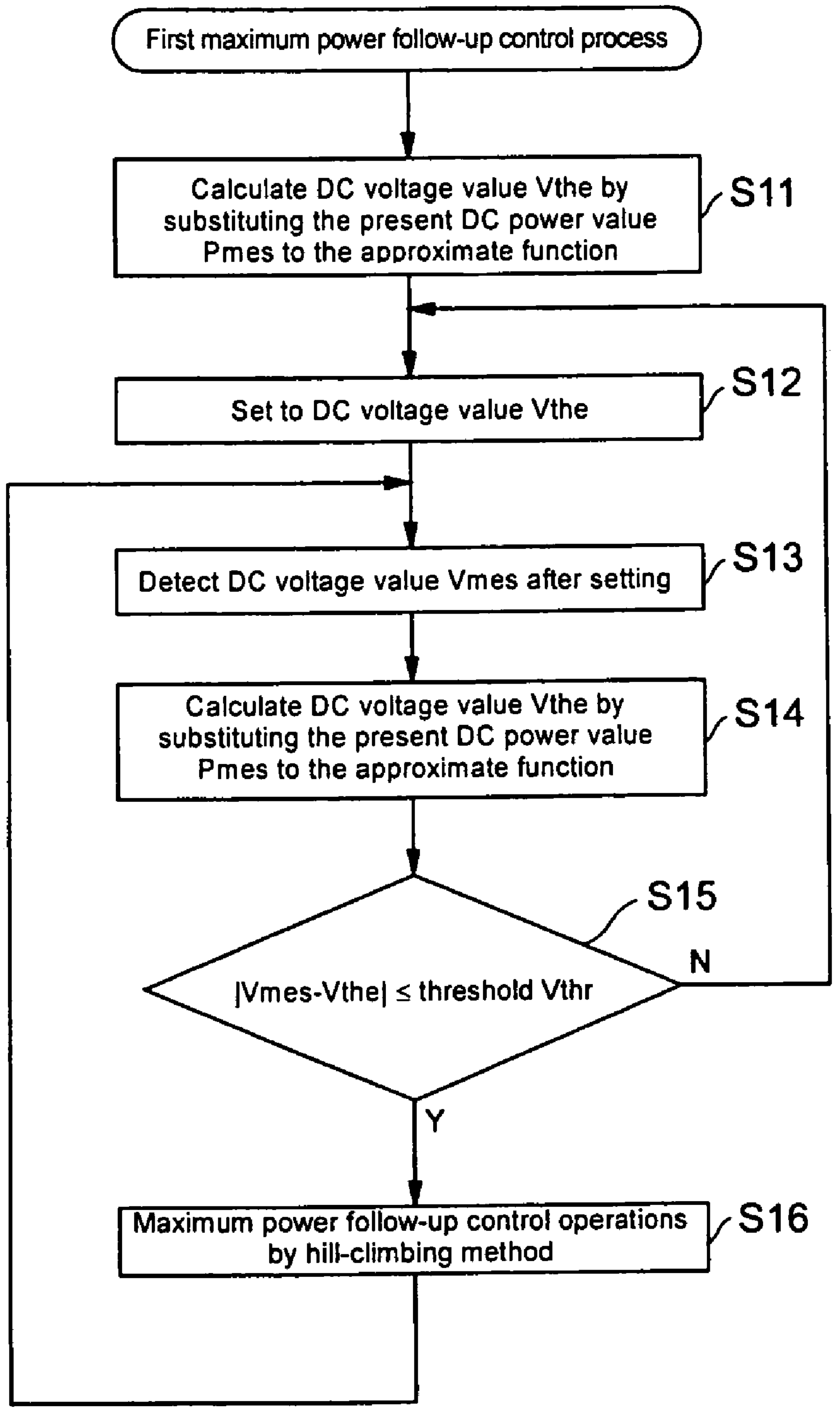
FIG. 3 shows a flowchart illustrating process operations of the maximum power follow-up control portion related to a first maximum power follow-up control process according to the first embodiment.

Operations of the dispersive power generation system 1 illustrating a first embodiment will now be explained. FIG. 3 is a flowchart illustrating process operations of the maximum power follow-up control portion 12 related to a first maximum power follow-up control process of the power conditioner 10 of the dispersive power generator system 1 representing the first embodiment.

The first maximum power follow-up control process as illustrated in FIG. 3 is a process that makes the present power point rapidly follow up to proximate of the maximum power point by utilizing an approximate function of the maximum power point of the V-P characteristics corresponding to the output level of the power generator 2 whereupon it is made to follow up with the maximum power point by using the hill-climbing method.

The follow-up control portion 34 within the control portion 27 of the maximum power follow-up control portion 12 as illustrated in FIG. 2 starts follow-up operations to the maximum power point by using an approximate function.

The voltage value calculating portion 31 calculates the DC voltage value Vthe by calculating the present DC power value Pmes through the power calculating portion 23, by reading out an approximate function from the approximate function memory 25, and by substituting the DC power value Pmes into the approximate function (Step S11).

The voltage value setting portion 32 sets the calculated DC voltage value Vthe as calculated in the voltage value calculating portion 31 as an operating voltage of the power converter 11 (Step S12).

Moreover, the voltage measuring portion 21 detects the present DC voltage value Vmes upon setting the DC voltage value Vthe in the voltage value setting portion 32 (Step S13).

Further, the voltage value calculating portion 31 calculates the DC voltage value Vthe by calculating the present DC power value Pmes through the power calculating portion 23, by reading out an approximate function from the approximate function memory 25, and by substituting the DC power value Pmes into the approximate function (Step S14).

Next, the threshold judging portion 33 judges whether an absolute value |Vmes−Vthe| of a difference between the present DC voltage value Vmes as detected in Step S13 and the DC voltage value Vthe as calculated in Step S14 is within a DC voltage threshold value Vthr or not (Step S15).

When it is judged in the threshold judging portion 33 that the absolute value |Vmes−Vthe| of the difference between the present DC voltage value Vmes and the DC voltage value Vthe is within the DC voltage threshold value Vthr, the follow-up control portion 34 judges that the present power point has reached proximate of the maximum power point, and starts maximum power follow-up operations by the hill-climbing method follow-up control portion 35 so as to start follow-up operations to the maximum power point by using the hill-climbing method from the approximate function (Step S16).

By using the hill-climbing method, the hill-climbing (method) follow-up control portion 35 proceeds to Step S13 for observing whether the power point is operating proximate of the maximum power point by substituting the present DC power value Pmes to the approximate function while continuing follow-up operations to the maximum power point until the maximum power point is reached.

When it is judged in Step S15 that the absolute value |Vmes−Vthe| of the difference between the present DC voltage value Vmes and the DC voltage value Vthe is not within the DC voltage threshold value Vthr, it is judged that the present power point has not reached proximate of the maximum power point, and the program proceeds to Step S12 for continuing maximum power follow-up operations on the basis of the approximate function until the proximity of the maximum power point is reached.

Further, when is judged in Step S15 that the absolute value |Vmes−Vthe|of the difference between the DC voltage value Vmes and the DC voltage value Vthe is not within the DC voltage threshold value Vthr after switching operations to the maximum power follow-up operations using the hill-climbing method, it is determined that the present power point has come off proximate of the maximum power point, and the program proceeds to Step S12 in order to start maximum power follow-up operations on the basis of approximate functions until the proximity of the maximum power point is reached.

Figure 4:
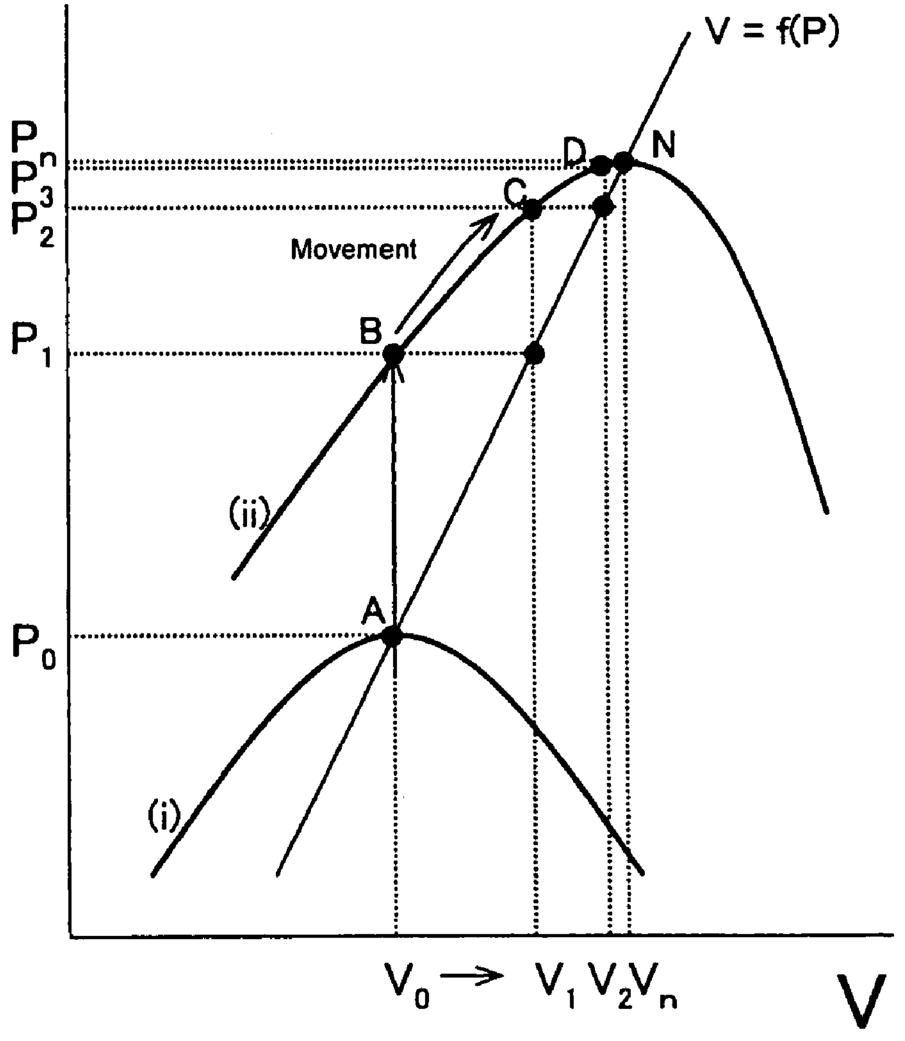
FIG. 4 shows an explanatory view of operations for simply showing an operation algorithm of the first maximum power follow-up control process.

The follow-up operations of the first maximum power follow-up control process will now be concretely explained. FIG. 4 is an explanatory view of operations for simply showing an operation algorithm of the first maximum power follow-up control process.

It is supposed that the approximate function of the power generator 2 is V=f (P), and that operations are being performed at power point A (V0, P0) with the output level of the power generator 2 being in a condition of (i).

Upon a dynamic change of the output level of the power generator 2 to a condition of (ii), the power point will move to power point B (V0, P1). At this time, the first maximum power follow-up control process will be started.

By first substituting the DC power value P1 of the present power point B to the approximate function V=f (P), the voltage value calculating portion 31 will calculate the DC voltage value V1. Upon setting the DC voltage value V1, the voltage value setting portion 32 will move to power point C (V1, P2).

By further substituting the DC power value P2 of the present power point C to the approximate function V=f(P), the voltage value calculating portion 31 will calculate the DC voltage value V2. At this time, the threshold judging portion 33 judges whether the absolute value |V1−V2| of the difference between the present DC voltage value V1 and the DC voltage value V2 as calculated through the approximate function is within the DC voltage threshold Vthr or not, and when it is judged that the absolute value |V1−V2| of the difference between the DC voltage values is not within the DC voltage threshold Vthr, it is determined that the present power point C has not reached the proximity of the maximum power point. In other words, maximum power follow-up operations using the approximate function will be continued until the present power point has reached proximate of the maximum power point.

By setting the DC voltage value V2 as calculated in the voltage value calculating portion 31 in the voltage value setting portion 32, the power point will move to power point D (V2, P3).

By substituting the DC power value P3 of the present power point D to the approximate function V=f(P), the voltage value calculating portion 31 will calculate the DC voltage value V3. At this time, it is judged in the threshold judging portion 33 whether the absolute value |V2−V3| of the difference between the present DC voltage value V2 and the DC voltage value V3 as calculated through the approximate function is within the DC voltage threshold value Vthr, and when it is judged that the absolute value |V2−V3| of the difference between the DC voltage values is within the DC voltage threshold, it is determined that the present power point D has reached proximate of the maximum power point.

When it is determined that the present power point D has reached proximate of the maximum power point, the hill-climbing method follow-up control portion 35 starts maximum power follow-up operations using the hill-climbing method, and the present power point will be made to follow up with the maximum power point N (Vn, Pn) by using this hill-climbing method.

According to the above first maximum power follow-up control process, the present power point is made to follow up with the maximum power point by using the hill-climbing method after making the present power point rapidly follow up with the proximity of the maximum power point by using an approximate function that corresponds to the output level of the power generator 2, the follow-up time for making the power point reach proximate of the maximum power point can be remarkably shortened so that follow-up to the maximum power point can be rapidly performed also when the power generator is a dynamic type power generator or the like in which changes in maximum power points with respect to changes in dynamics are large, and it is accordingly possible to improve the power generation efficiency.

While various methods may be considered as a method for creating the approximate function V=f(P) as stored in the approximate function memory 25, the following explanations are based on three exemplary methods.

Figure 5:
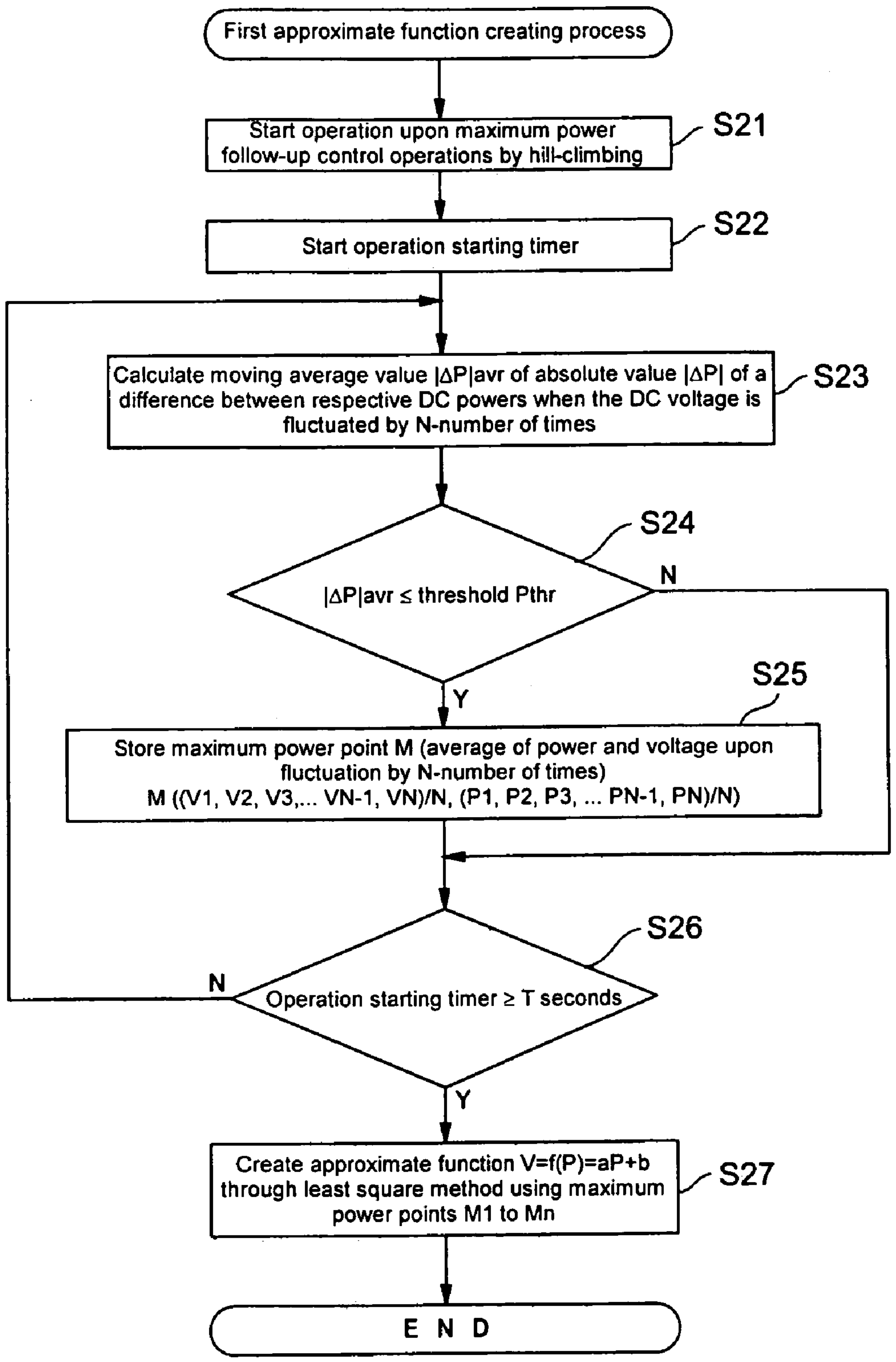
FIG. 5 shows a flowchart illustrating process operations of an approximate function creating portion related to a first approximate function creating process according to the first embodiment.
Figure 6:
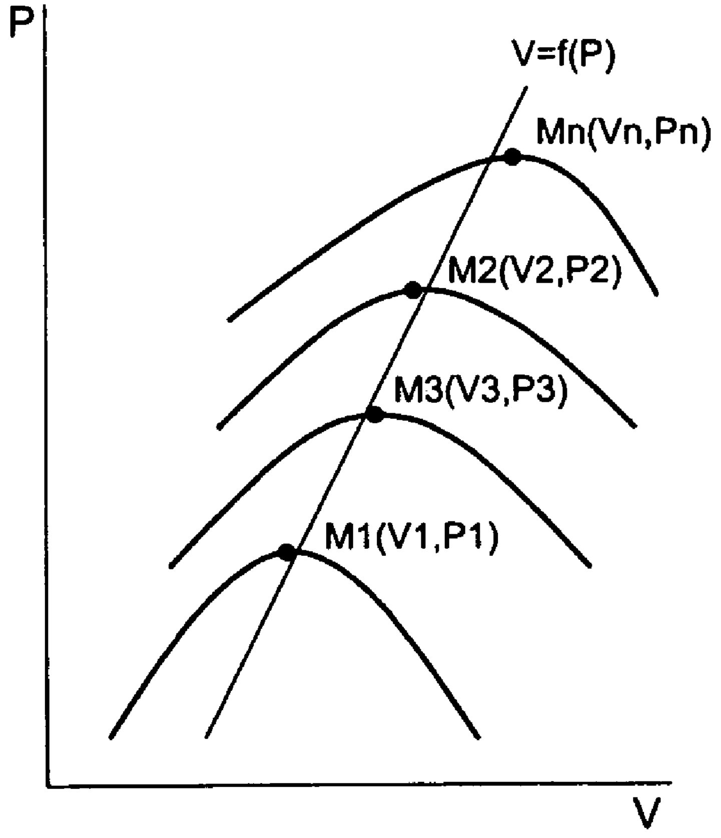
FIG. 6 shows an explanatory view of operations for simply showing an operation algorithm of the first approximate function creating process.

FIG. 5 is a flowchart illustrating process operations of the approximate function creating portion 24 related to a first approximate function creating process, and FIG. 6 is an explanatory view of operations for simply showing an operation algorithm of the first approximate function creating process.

The first approximate function creating process as illustrated in FIG. 5 is a process of detecting a plurality of maximum power points of the power generator 2 by using the hill-climbing method and of creating an approximate function on the basis of the plurality of maximum power points.

In FIG. 5, the approximate function creating portion 24 starts maximum power follow-up operations using the hill-climbing method through the hill-climbing method follow-up control portion 35 (Step S21), and starts an operation starting timer for timing a specified period of time T seconds (Step S22).

The approximate function creating portion 24 calculates a moving average value |⊿P|avr of an absolute value |⊿P| of a difference between respective DC power values when the DC voltage value is fluctuated by N-number of times (Step S23).

The approximate function creating portion 24 judges whether the moving average value |⊿P|avr is within a threshold for storing a maximum power point Pthr or not (Step S24).

When it is judged that the moving average value |⊿P|avr is within the threshold for storing a maximum power point Pthr, the approximate function creating portion 24 determines that the present power point has reached proximate of the maximum power point considering the fact that when the moving average value 1, |⊿P|avr is small to some extent that fluctuations in DC voltage value will result small fluctuations in power, and this power point is stored as the maximum power point M (V, P) (Step S25). In this respect, the maximum power point M is comprised of an average value of voltage values (V1, V2, V3 . . . VN)/N in which the DC voltage values are fluctuated by N-number of times and an average value of power values (P1, P2, P3 . . . PN)/N.

When the maximum power point M is stored, the approximate function creating portion 24 judges whether the operation starting timer that has been started in Step S22 has run out (Step S26).

When the operation starting timer has not run out, the approximate function creating portion 24 proceeds to Step S23 to further detect and store another maximum power point M.

When the operation starting timer has run out, the approximate function creating portion 24 creates an approximate function by calculating constants a, b of an approximate function V=f(P)=aP+b through the least square method on the basis of the maximum power points M (M1 to Mn) that are presently being stored as illustrated in FIG. 6 (Step S27), and the created approximate function is stored in the approximate function memory 25 for terminating the process operations.

According to the first approximate function creating process, maximum power follow-up operations of the hill-climbing method are performed until the operation starting timer has run out for detecting a plurality of maximum power points, and the approximate function is created on the basis of the plurality of maximum power points so that it is possible to obtain an approximate function of high accuracy.

In this respect, when the time for the operation starting timer is set to be long, probabilities that changes in external environments such as the flow amount of water or the wind speed occur will become higher so that the amount of samples of maximum power points is increased which will result in a higher accuracy of the approximate function.

However, according to the first approximate function creating process, where the changes in external environments take place rapidly and frequently, the external environments will change prior the maximum power points are reached so that the number of samples of the maximum power points will be reduced. Accordingly, it may happen that the accuracy of the approximate function becomes worse.

Figure 7:
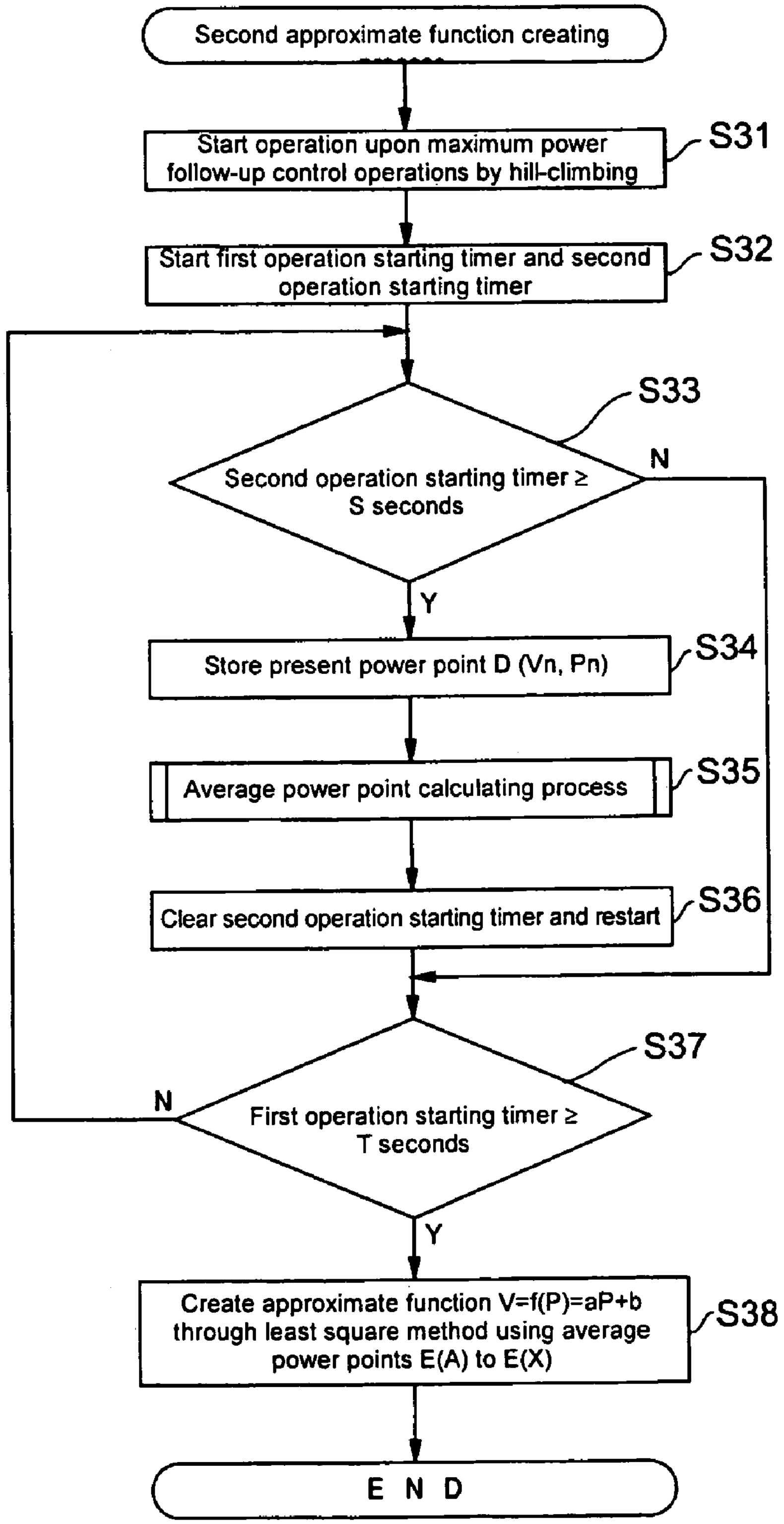
FIG. 7 shows a flowchart illustrating process operations of the approximate function creating portion related to a second approximate function creating process.
Figure 8:
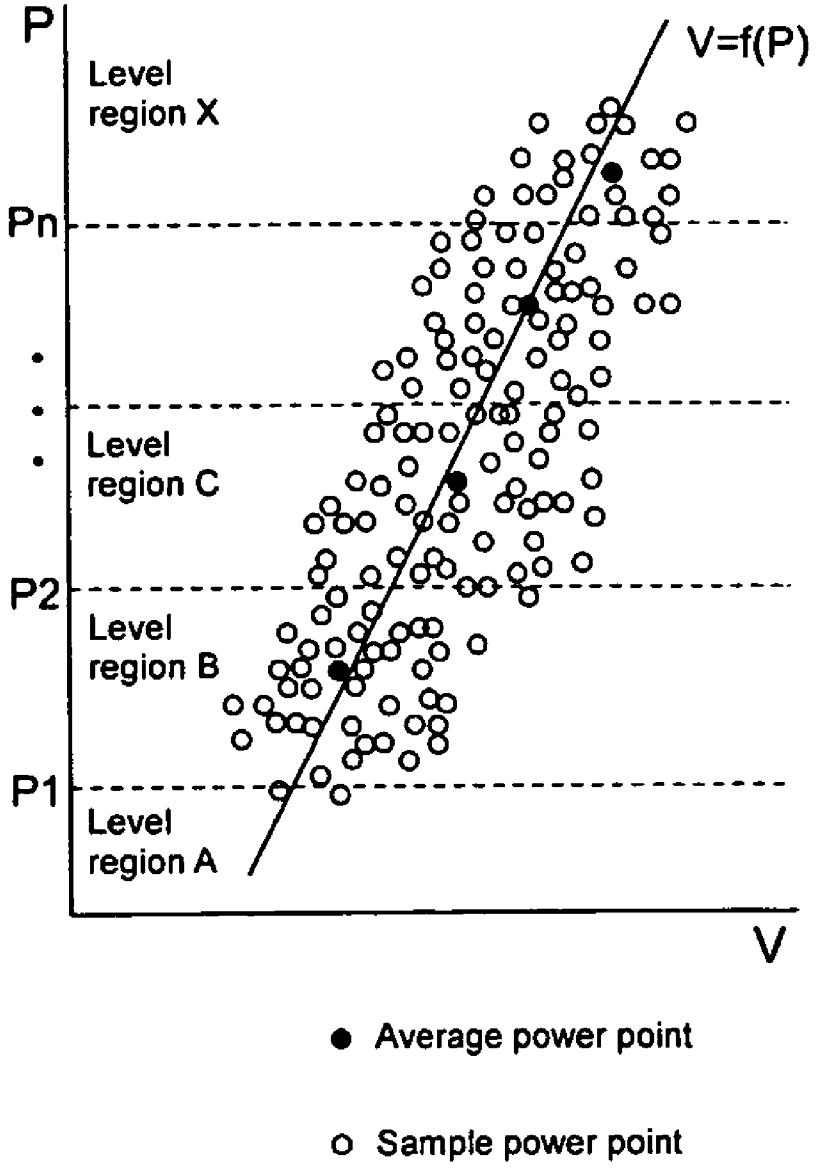
FIG. 8 shows an explanatory view of operations for simply showing an operation algorithm of the second approximate function creating process.
Figure 9:
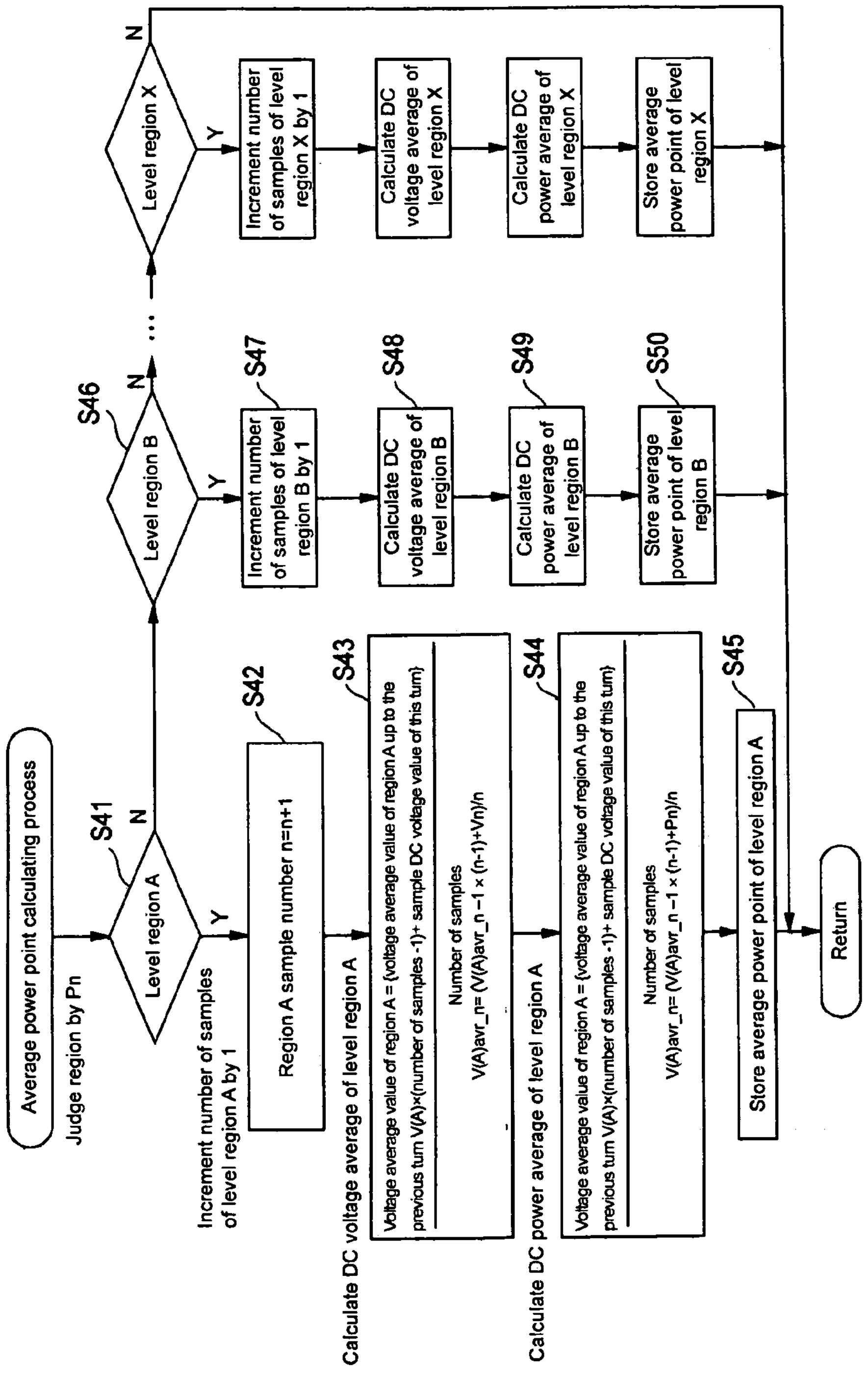
FIG. 9 shows a flowchart illustrating process operations of the approximate function creating portion related to an average power point calculating process of the second approximate function creating process.

For coping with such a condition, a method of a second approximate function creating process may be considered. FIG. 7 is a flowchart illustrating process operations of the approximate function creating portion 24 related to a second approximate function creating process, FIG. 8 is an explanatory view of operations for simply showing an operation algorithm of the second approximate function creating process, and FIG. 9 is a flowchart illustrating process operations of the approximate function creating portion 24 related to an average power point calculating process of the second approximate function creating process.

The second approximate function creating process as illustrated in FIG. 7 is a process of separating the power of the power generator 2 into a plurality of level regions, obtaining a plurality of samples of power points for each of the level regions by using the hill-climbing method, and of setting an average value of each level region as average power points by averaging samples of power points of each level region, and of creating an approximate function on the basis of the plurality of average power points.

In FIG. 7, the approximate function creating portion 24 starts maximum power follow-up operations by the hill-climbing method through the hill-climbing method follow-up control portion 35 (Step S31) and timing operations of a first operation starting timer and a second operation starting timer are started (Step S32). In this respect, the first operation starting timer is a timer for timing a terminating time (T seconds) for detecting samples of power points in all level regions while the second operating starting timer is a timer for timing a terminating time (S seconds) for detecting samples of power points in each level region.

The approximate function creating portion 24 judges whether the second operation starting timer has run out or not (Step S33). When the second operation starting timer has run out, the approximate function creating portion 24 detects the present power point D (Vn, Pn) by the hill-climbing method and the present power point D is stored as a sample (Step S34).

As illustrated in FIG. 8, the approximate function creating portion 24 first executes the average power point calculating process (Step S35) of FIG. 9 for calculating an average power point corresponding to the level region on the basis of the power point that has been stored as a sample whereupon the timing operations of the second operation starting timer is cleared to be started again (Step S36).

The approximate function creating portion 24 judges whether the first operation starting timer has run out or not (Step S37).

When the first operation starting timer has run out, the approximate function creating portion 24 creates an approximate function by calculating constants a, b of an approximate function V=f(P)=aP+b through the least square method on the basis of the average power points E(A) to E(X) of the respective level regions (Step S38), and the created approximate function is stored in the approximate function memory 25 for terminating the process operations.

When the first operation starting timer has not run out in Step 37, the approximate function creating portion 24 proceeds to Step S33 for calculating further average power points.

The average power point calculating process of FIG. 9 is a process of averaging from a plurality of samples of power points for respective level regions as illustrated in FIG. 8 and of calculating average power points for each level region.

In FIG. 9, the approximate function creating portion 24 detects a DC power value from the power point that has been stored as a sample and judges whether the power point is in level region A on the basis of the DC power value (Step S41).

When it is judged on the basis of the DC power value that the power point is in level region A, the approximate function creating portion 24 increments the number of samples n of the level region A by 1 (Step S42), performs averaging of the DC voltage values of the samples of level region A for calculating a DC voltage average value V(A) avr_n of the level region A (Step S43).

In this respect, the approximate function creating portion 24 calculates the DC voltage average value V(A)avr_n of the level region A by using an equation (DC voltage average value of previous turn V(A)avr_(n−1)*(n−1)+sample DC voltage value of this turn Vn)/number of samples n.

The approximate function creating portion 24 averages the DC voltage values of the samples of level region A for calculating the DC voltage average value P(A)avr_n of the level region A (Step S44).

In this respect, the approximate function creating portion 24 calculates the DC voltage average value P(A)avr_n of the level region A by using an equation (DC voltage average value of previous turn P(A)avr_(n−1)*(n−1)+sample DC voltage value of this turn Pn)/number of samples n.

The approximate function creating portion 24 obtains the average power point of the level region A from the DC voltage average value V(A)avr_n of the level region A as calculated in StepS43 and the DC power average value P(A)avr_n of the level region A as calculated in Step S44, and by storing this average power point of the level region A (Step S45) the program proceeds to Step S36 of FIG. 7.

When it is judged in Step S41 that the DC power value of the power point of the same is not in level region A, the approximate function creating portion 24 judges whether the DC power voltage of the sample power point is in level region B (Step S46).

When it is judged that the DC power voltage of the sample power point is in level region B, the approximate function creating portion 24 increments the number of samples n of the level region B by 1 in the same manner as in Step S42 (Step S47).

The approximate function creating portion 24 calculates a DC voltage average value of the level region B in the same manner as in Step S43 (Step S48).

The approximate function creating portion 24 calculates a DC power average value of the level region B in the same manner as in Step S44 (Step S49).

The approximate function creating portion 24 obtains the average power point of the level region B from the DC voltage average value of the level region B as calculated in Step S48 and the DC power average value of the level region B as calculated in Step S49, and by storing this average power point of the level region B (Step S50), the program proceeds to Step S36 of FIG. 7.

In this manner, when it is judged in Step S46 that the DC power value of the sample power point is not in level region B, the approximate function creating portion 24 obtains average power points of respective level regions by performing similar process operations for the DC power values of the sample power points for each of the level region C, level region D . . . level region X to respective calculate DC voltage average values and DC power average values for level regions corresponding to sample power points, and by storing the average power points for the level regions, the program proceeds to Step S36 of FIG. 7.

According to the second approximate function creating process, the power of the power generator 2 is separated into a plurality of level regions, a plurality of power points of samples is obtained for each of the level regions by using the hill-climbing method, DC voltage average values and DC power average values of sample power points are calculated for each level region for setting the DC voltage average values and DC power average values as average power points whereupon these average power points of the respective level regions are stored for creating an approximate function on the basis of the power average points for each level region. With this arrangement, it is possible to create an approximate function of high accuracy also where changes in external environment take place rapidly and frequently when compared to the first approximate function creating process.

Figure 10:
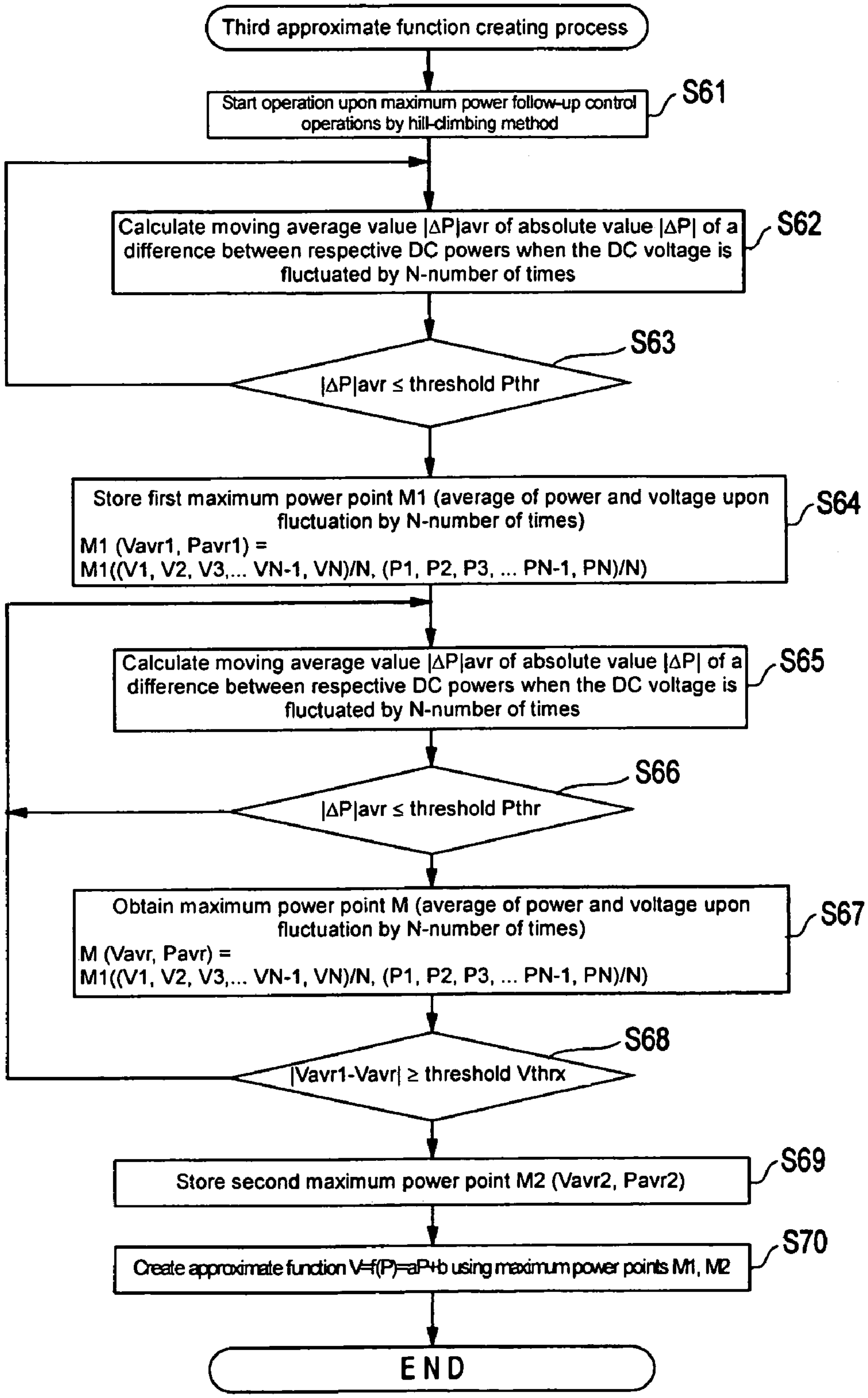
FIG. 10 shows a flowchart illustrating process operations of the approximate function creating portion related to a third approximate function creating process.
Figure 11:
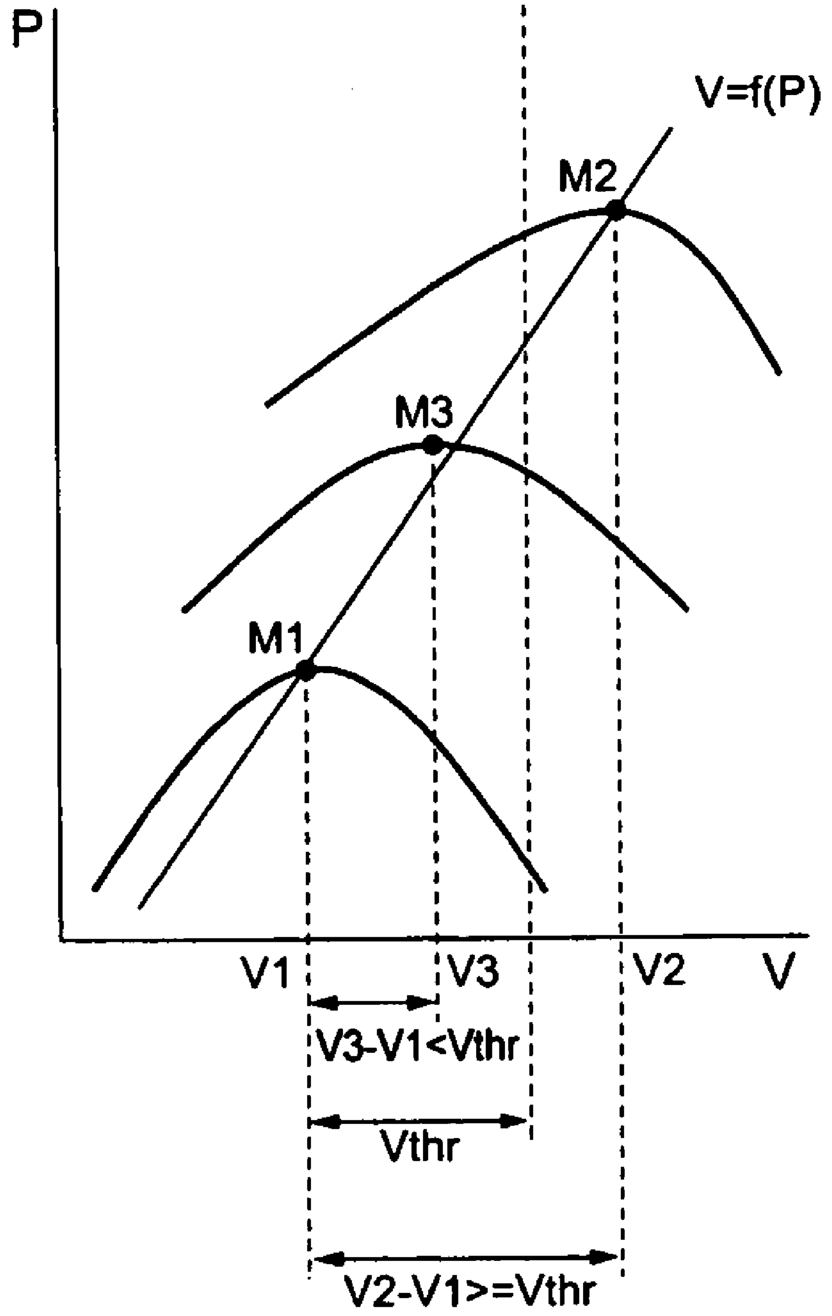
FIG. 11 shows an explanatory view of operations for simply showing an operation algorithm of the third approximate function creating process.

A third approximate function creating process will now be explained. FIG. 10 is a flowchart illustrating process operations of the approximate function creating portion 24 related to the third approximate function creating process, and FIG. 11 is an explanatory view of operations for simply showing an operation algorithm of the third approximate function creating process.

The approximate function creating process as illustrated in FIG. 10 is a process of detecting two maximum power points of the power generator 2 by using the hill-climbing method 2 and of creating an approximate function on the basis of the two maximum power points.

In FIG. 10, the approximate function creating portion 24 starts maximum power follow-up operations by using the hill-climbing method through the hill-climbing method follow-up control portion 35 (Step S61), and calculates a moving average value |⊿P|avr of an absolute value |⊿P| of a difference between respective DC power values when the DC voltage value is fluctuated by N-number of times (Step S62).

The approximate function creating portion 24 judges whether the moving average value |⊿P|avr is within a threshold for storing a maximum power point Pthr or not (Step S63).

When it is judged that the moving average value |⊿P|avr is within the threshold Pthr for storing a maximum power point, the approximate function creating portion 24 determines that the present power point has reached proximate of the maximum power point considering the fact that when the moving average value |⊿P|avr is small to some extent that fluctuations in DC voltage value will result small fluctuations in power, and this power point is stored as the first maximum power point M1 (Vavr1, Pavr1) (Step S64). In this respect, the maximum power point M1 is comprised of an average value of voltage values (V1, V2, V3 . . . VN)/N in which the DC voltage values are fluctuated by N-number of times and an average value of power values (P1, P2, P3 . . . PN)/N.

The approximate function creating portion 24 calculates a moving average value |⊿P|avr of an absolute value |⊿P| of a difference between respective DC power values when the DC voltage value is fluctuated by N-number of times (Step S65).

The approximate function creating portion 24 judges whether the moving average value |⊿P|avr is within a threshold for storing a maximum power point Pthr or not (Step S66).

When it is judged that the moving average value |⊿P|avr is within the threshold for storing a maximum power point Pthr, the approximate function creating portion 24 determines that the present power point has reached proximate of the maximum power point, and this power point is acquired as a maximum power point M (Vavr, Pavr) (Step S67).

The approximate function creating portion 24 judges whether an absolute value |Vavr1−Vavr| of a difference between the DC voltage value Vavr1 of the maximum power point M1 that is being stored and the DC voltage value Vavr of the acquired maximum power point M is not less than a threshold for acquiring a maximum power point Vthrx (Step S68) or not. In this respect, for eliminating errors in the approximate function to some extent, the threshold for acquiring a maximum power point Vthrx is a threshold for acquiring a second maximum power point M2 that is as remote as possible from the first maximum power point M1 as illustrated in FIG. 11.

When it is judged that the absolute value |Vavr1−Varv| of the difference between the DC voltage values is not less than the threshold for acquiring a maximum power point Vthrx (see maximum power point M2 in FIG. 11), the maximum power point M acquired in Step S67 is set as the second maximum power point M2, and this maximum power point M2 (Vavr2, Pavr2) is stored (Step S69).

The approximate function creating portion 24 creates an approximate function by calculating constants a, b of an approximate function V=f(P)=aP+b through the least square method on the basis of the maximum power points M1, M2 that are presently being stored (Step S70), and the created approximate function is stored in the approximate function memory 25 for terminating the process operations.

When it is judged that the moving average value |⊿P|avr is not within the threshold for storing a maximum power point Pthr in Step S63, the process proceeds to Step S62 for detecting a new maximum power point.

When it is judged that the moving average value |⊿P|avr is not within the threshold for storing a maximum power point Pthr in Step S66, the process proceeds to Step S65 for detecting a new maximum power point.

When it is judged in Step S68 that the absolute value |Vavr1−Vavr| of the difference between the DC voltage values is less than the threshold for acquiring a maximum power point Vthrx (see maximum power point M3 in FIG. 11), it is determined that the maximum power point M acquired in Step S67 and the first maximum power point M1 are not remote from each other so that the program proceeds to Step S65 for detecting a new maximum power point.

According to the third approximate function creating process, maximum power follow-up operations by the hill-climbing method are executed, two maximum power points that are remote from each other by not less than a threshold for acquiring a maximum power point Vthrx are detected, and an approximate function is created on the basis of these maximum power points so that it is possible to rapidly create an approximate function even though the accuracy is somewhat degraded when compared to the first approximate function creating process and the second approximate function creating process.

According to the first embodiment, the present power point is made to reach the maximum power point by the hill-climbing method after the present power point has been rapidly made to follow up with the proximity of the maximum power point by using an approximate function corresponding to an output level of the power generator 2 so that by remarkably shortening the follow-up time for making the power point reach proximate of the maximum power point, the follow-up to the maximum power point can be rapidly performed also when the power generator 2 is a dynamic type power generator or the like in which changes in maximum power points with respect to changes in dynamics are large, and it is accordingly possible to improve the power generation efficiency.

While the above first embodiment is arranged in that the hill-climbing method is used after executing follow-up operations to proximate of the maximum power point by using the approximate function for finally executing follow-up operations to the maximum power point, it is also possible to provide correction functions for correcting errors in the approximate function during execution of the follow-up operations to the maximum power point by using the hill-climbing method, and such an embodiment will be explained as the second embodiment.

Second Embodiment

Figure 12:
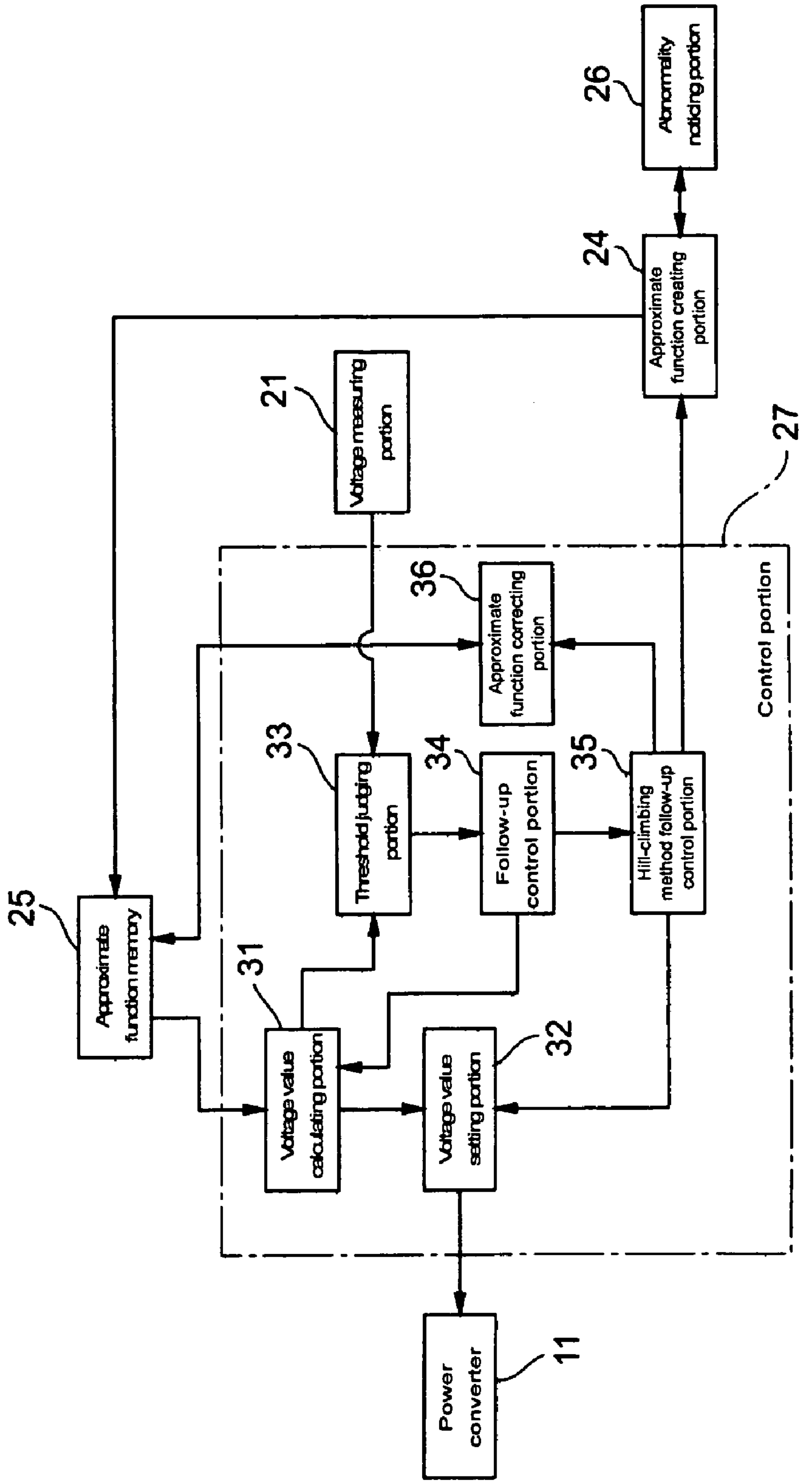
FIG. 12 shows a block view illustrating a schematic arrangement of an interior of a control portion, which comprises a main portion of a power conditioner of a dispersive power generation system illustrating a second embodiment.

FIG. 12 is a block view illustrating a schematic arrangement of an interior of a control portion 27 of a power conditioner 10 related to the second embodiment. In this respect, components that are identical to those of the dispersive power generation system 1 representing the first embodiment are marked with the same reference numerals to thereby omit explanations of the overlapping arrangements and operations.

The control portion 27 as illustrated in FIG. 12 includes a voltage value calculating portion 31, a voltage value setting portion 32, a threshold judging portion 33, a follow-up control portion 34 and a hill-climbing method follow-up control portion 35, and it further includes an approximate function correcting portion 36 for correcting errors of the approximate function that is being stored in the approximate function memory 25 by using the hill-climbing method of the hill-climbing method follow-up control portion 35.

In this respect, the first approximate function correcting part, the second approximate function correcting part and the third approximate function correcting part as recited in the claims correspond to the approximate function correcting portion 36.

Figure 13:
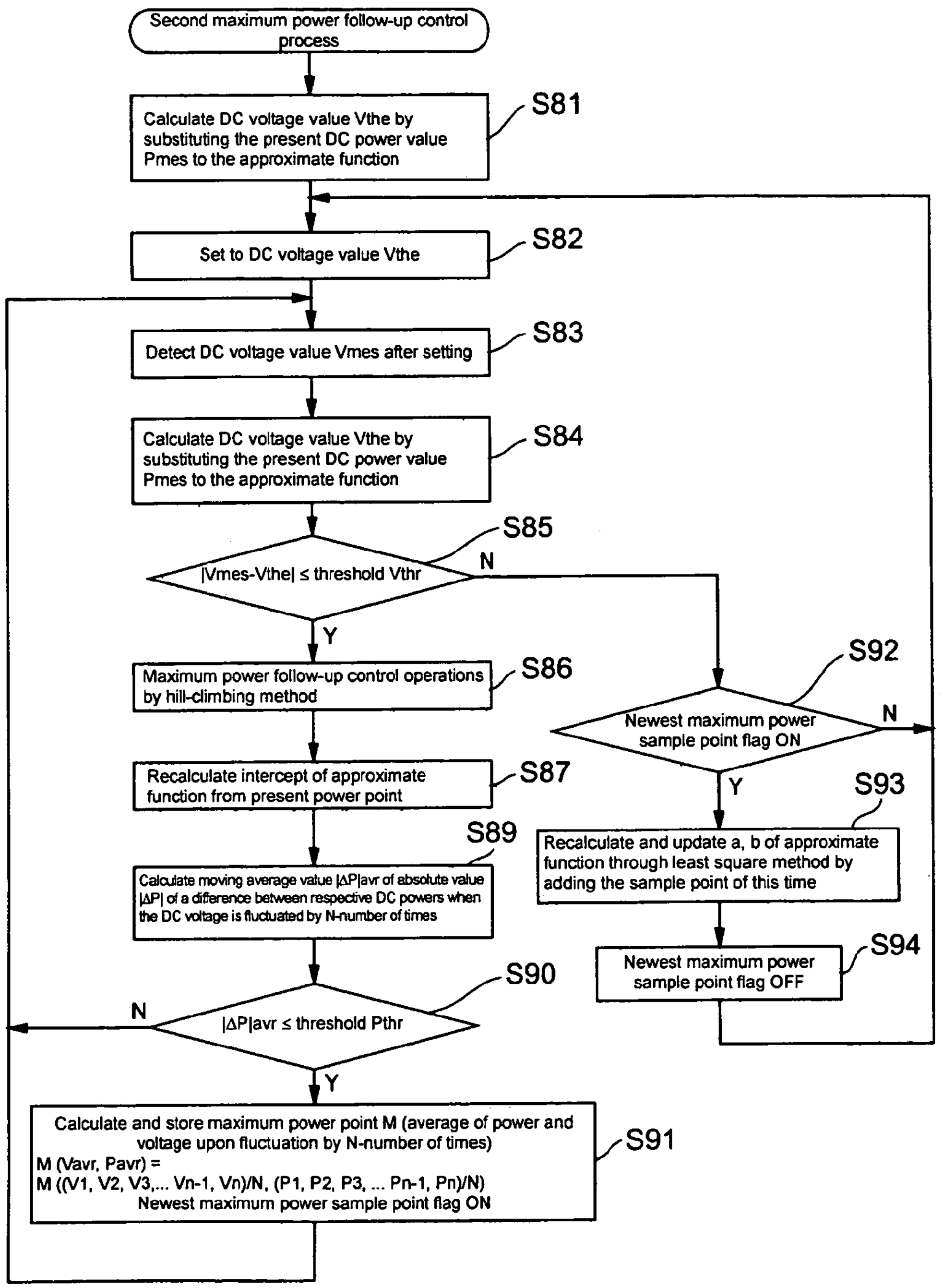
FIG. 13 shows a flowchart illustrating process operations of the maximum power follow-up control portion related to a second maximum power follow-up control process according to the second embodiment.

Operations of the dispersive power generation system 1 representing the second embodiment will now be explained. FIG. 13 is a flowchart illustrating process operations of the maximum power follow-up control portion 12 related to a second maximum power follow-up control process according to the second embodiment.

The second maximum power follow-up control process as illustrated in FIG. 13 is a process of making the present power point follow up with the maximum power point by using the hill-climbing method after making the present power pint rapidly follow up with proximate of the maximum power point by using an approximate function and of correcting errors of the approximate function while executing follow-up operations of the hill-climbing method.

In FIG. 13, the follow-up control portion 34 within the control portion 27 of the maximum power follow-up control portion 12 starts follow-up operations to the maximum power point by using an approximate function.

The voltage value calculating portion 31 calculates the DC voltage value Vthe by calculating the present DC power value Pmes through the power calculating portion 23, by reading out an approximate function from the approximate function memory 25, and by substituting the DC power value Pmes into the approximate function (Step S81).

The voltage value setting portion 32 sets the DC voltage value Vthe as calculated in the voltage value calculating portion 31 as an operating voltage of the power converter 11 (Step S82).

Moreover, the voltage measuring portion 21 detects the present DC voltage value Vmes upon setting the DC voltage value Vthe in the voltage value setting portion 32 (Step S83).

Further, the voltage value calculating portion 31 calculates the DC voltage value Vthe by calculating the present DC power value Pmes through the power calculating portion 23, by reading out an approximate function from the approximate function memory 25, and by substituting the DC power value Pmes into the approximate function (Step S84).

Next, the threshold judging portion 33 judges whether an absolute value |Vmes−Vthe| of a difference between the present DC voltage value Vmes as detected in Step S33 and the DC voltage value Vthe as calculated in Step S34 is within a DC voltage threshold value Vthr or not (Step S85).

Figure 14:
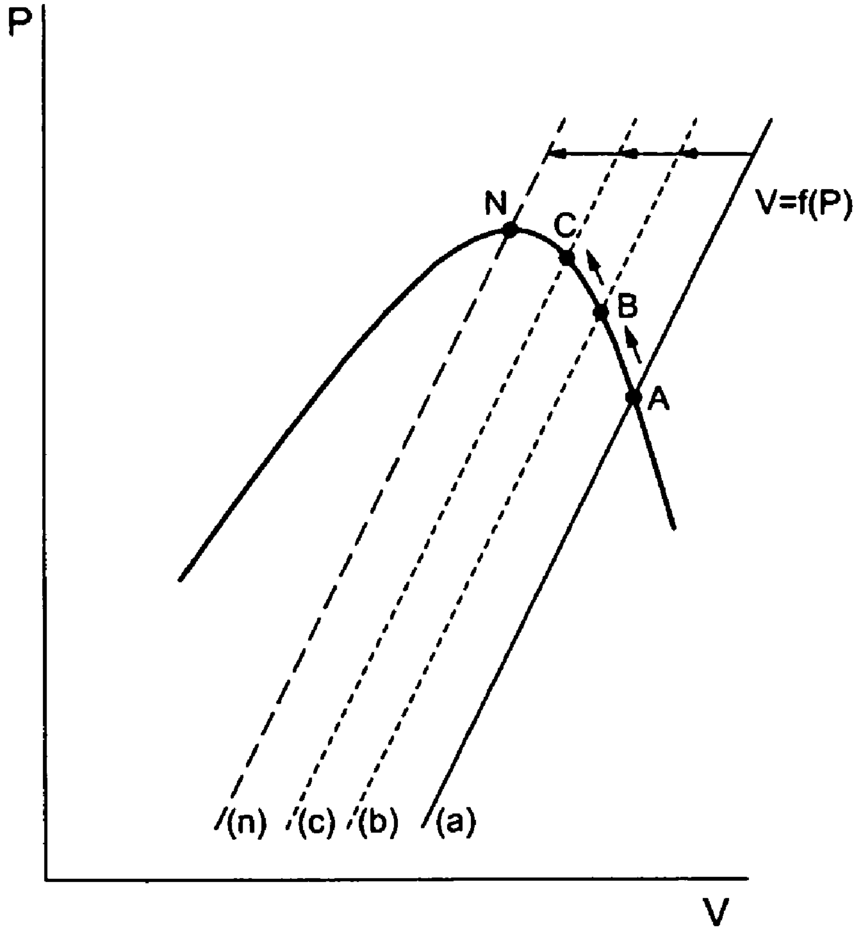
FIG. 14 shows an explanatory view of operations for simply showing an operation algorithm of the second maximum power follow-up control process.
Figure 15:
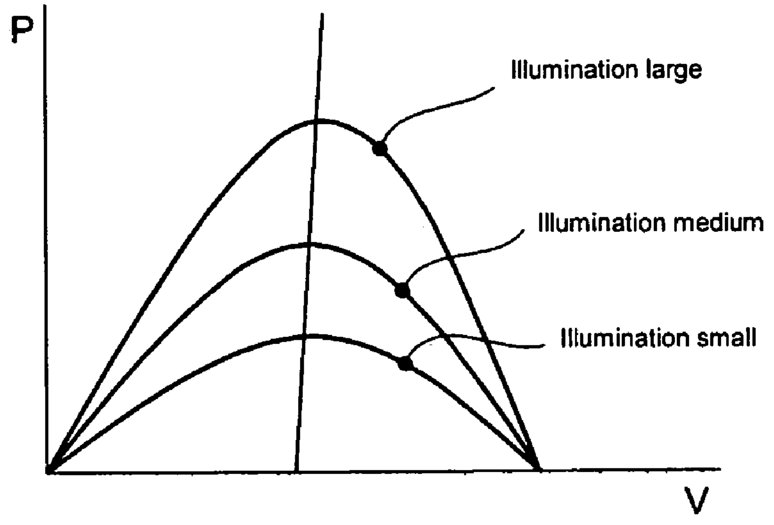
FIG. 15 shows an explanatory view illustrating characteristics of DC power and DC voltage (V-P characteristics) in a general solar power generator.
Figure 16:
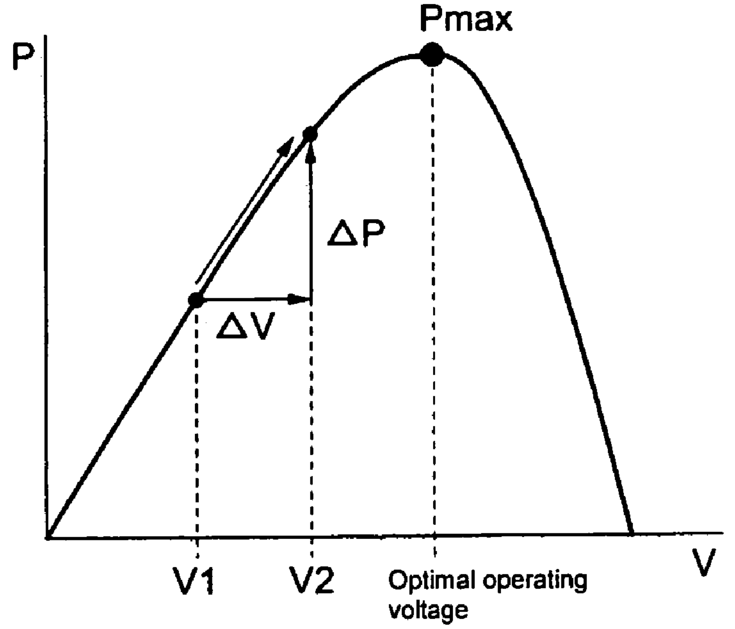
FIG. 16 shows an explanatory view of operations for simply showing an operation algorithm of a general hill-climbing method.
Figure 17:
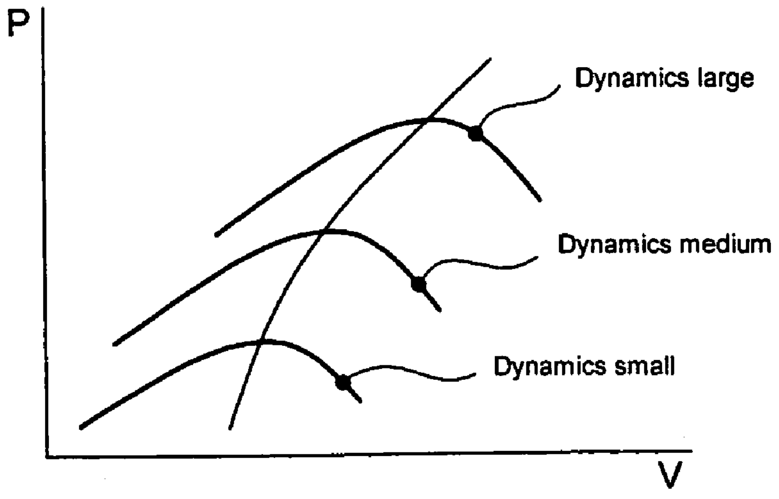
FIG. 17 shows an explanatory view illustrating characteristics of DC power and DC voltage (V-P characteristics) in a general dynamic type power generator.
Figure 18:
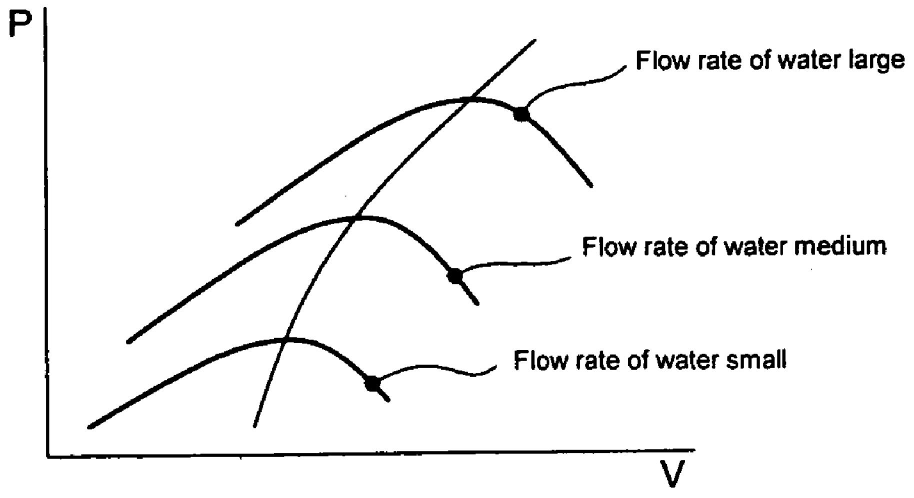
FIG. 18 shows an explanatory view illustrating characteristics of DC power and DC voltage (V-P characteristics) in a general hydraulic type power generator.
Figure 19A:
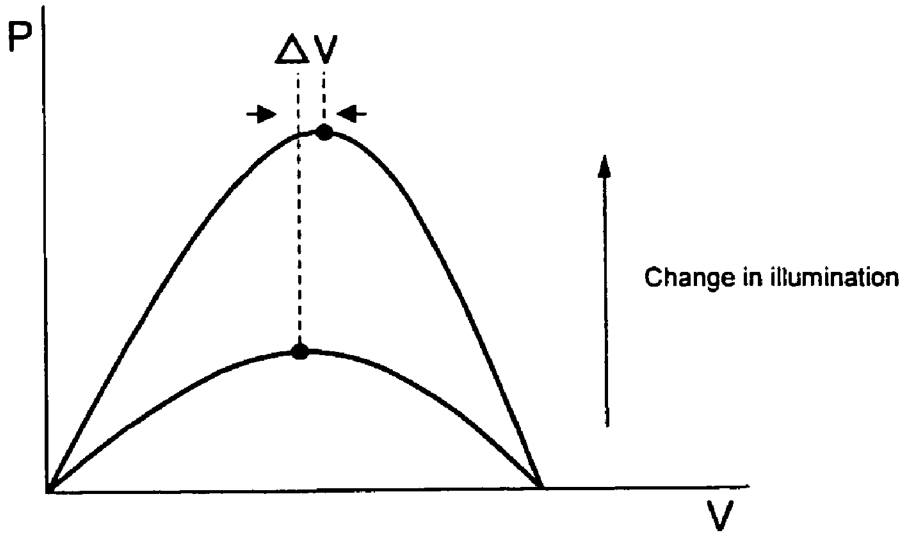
FIG. 19A shows an explanatory view for comparing characteristics of DC power and DC voltage (V-P characteristics) of solar power generator.
Figure 19B:
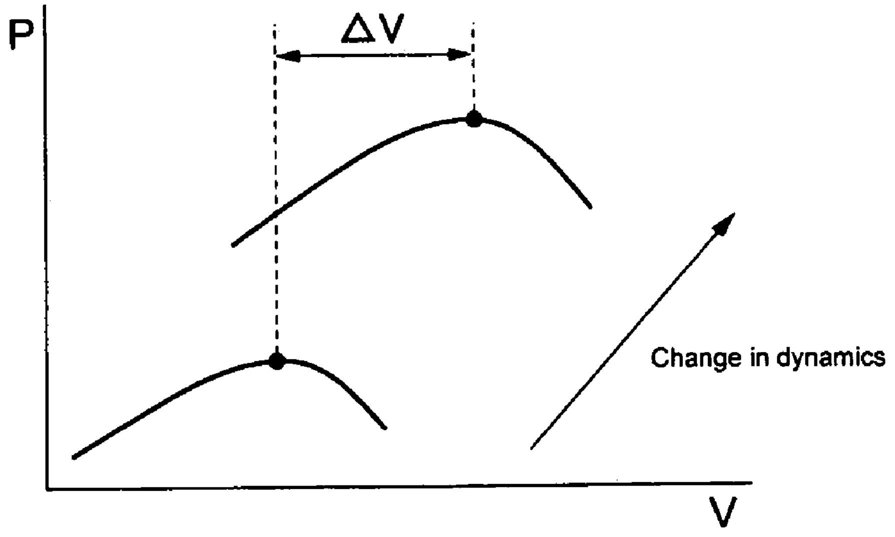
FIG. 19B shows an explanatory view for comparing characteristics of DC power and DC voltage (V-P characteristics) of dynamic type power generator.

When it is judged in the threshold judging portion 33 that the absolute value |Vmes−Vthe| of the difference between the present DC voltage value Vmes and the DC voltage value Vthe is within the DC voltage threshold value Vthr, the follow-up control portion 34 judges that the present power point has reached proximate of the maximum power point, and starts maximum power follow-up operations by the hill-climbing method follow-up control portion 35 so as to start follow-up operations to the maximum power point by using the hill-climbing method from those using the approximate function (Step S86). In this respect, when it is determined that the power point A of FIG. 14 is proximate of the maximum power point, movement of the power point towards the maximum power point N by using the hill-climbing method is started such that it moves from, for instance, power point A→power point B→power point C . . . .

The approximate function correcting portion 36 recalculates an intercept of the approximate function from the present power point (Step S87). In this respect, in the recalculation of the intercept of the approximate function, only a constant of the intercept of the approximate function is calculated on the basis of the present power point so that only the intercept is changed while the slope of the approximate function is not changed. Accordingly, the approximate function is updated as illustrated in FIG. 14 from (a)→(b)→(c)→(n).

The approximate function correcting portion 36 calculates a moving average value |⊿P|avr of an absolute value |⊿P|avr of a difference between respective DC power values when the DC voltage value is fluctuated by N-number of times (Step S89).

The approximate function correcting portion 36 judges whether the moving average value |⊿P|avr is within a threshold for storing a maximum power point Pthr or not (Step S90).

When it is judged that the moving average value |⊿P|avr is within the threshold for storing a maximum power point Pthr, the approximate function correcting portion 36 determines that the present power point has reached proximate of the maximum power point considering the fact that when the moving average value |⊿P|avr is small to some extent that fluctuations in DC voltage value will result small fluctuations in power, and this power point is stored as the maximum power point M (Vavr, Pavr) and a newest maximum power sample point flag is turned ON (Step S91) to thereby proceed to Step S83. In this respect, the maximum power point M is comprised of an average value of voltage values (V1, V2, V3 . . . VN)/N in which the DC voltage values are fluctuated by N-number of times and an average value of power values (P1, P2, P3 . . . PN)/N. The newest maximum power sample point flag is a flag for indicating whether the maximum power point in question has already been stored as a sample in the hill-climbing method or not.

When it is judged in Step S85 that the absolute value |Vmes−Vthe| of the difference between the DC voltage value Vmes and the DC voltage value Vthe is not within a DC voltage threshold value Vthr, the approximate function correcting portion 36 determines that the present power point has not reached proximate of the maximum power point, and it is judged whether the newest maximum power sample point flag is turned ON or not (Step S92). In this respect, when the present power point has come off proximate of the maximum power point owing to changes in external environments or the like even follow-up operations by the hill-climbing method have been once performed after follow-up operations by the approximate function, the follow-up operations are switched to those using the approximate function.

When it is judged that the newest maximum power sample point flag is turned ON, the approximate function correcting portion 36 determines that the newest maximum power point has been stored, and the oldest sample of the maximum power point is deleted from among the past maximum power points on the basis of which an approximate function has been created, and by adding the newest maximum power point as a sample, an approximate function is created on the basis of those sample points of maximum power points, and this approximate function is stored and updated in the approximate function memory 25 (Step S93).

In other words, since the approximate function is created on the basis of sample points including the newest maximum power point, it is possible to correct errors in the approximate function.

The approximate function correcting portion 36 then turns the newest maximum power sample point flag OFF (Step S94), and the program proceeds to Step S82 for executing follow-up operations to proximate of the maximum power point by using the approximate function.

When it is judged in Step S90 that the moving average value |⊿P|avr is not within the threshold for storing the maximum power point Pthr, the approximate function correcting portion 36 determines that the present power point has not reached proximate of the maximum power point yet, and the program proceeds to Step S83.

According to the second embodiment, after making the power point reach proximate of the maximum power point by using an approximate function, it is made to reach the maximum power point by using the hill-climbing method, wherein the power point is detected by using the hill-climbing method and errors in an intercept of the approximate function are corrected on the basis of the power point so that it is possible to correct errors in the approximate function.

According to the second embodiment, after reaching the maximum power point by using the hill-climbing method, the maximum power point is stored as a sample, and in the presence of changes in external environments or similar, an approximate function is created on the basis of sample points including the newest maximum power point as a sample so that it is possible to provide a newest approximate function of free of errors corresponding to those changes in external environments or similar.

In this respect, while the above embodiments are arranged in that when creating an approximate function in the approximate function creating portion 24, such an approximate function is calculated by the least square method on the basis of a plurality of maximum power points (average power points), it goes without saying that it is possible to employ a method other than the least square method.

According to the maximum power follow-up control apparatus of the present invention of the above-described arrangement, an approximate function related to a maximum power point corresponding to an output level of a power generator of characteristics of the output power and the operating voltage is stored, an operating voltage value corresponding to the present output power is calculated on the basis of the approximate function for making the power point related to the present output power follow up with the maximum power point, and the operating voltage value is set as an operating voltage value for a power converter. With this arrangement of using an approximate function, the follow-up time for making the power point reach proximate of the maximum power point can, for instance, be remarkably shortened so that follow-up to the maximum power point can be rapidly performed also when the power generator is a dynamic type power generator or the like in which changes in maximum power points with respect to changes in dynamics are large, and it is accordingly possible to improve the power generation efficiency.

According to the maximum power follow-up control apparatus of the present invention, when an operating voltage value is set in the voltage value setting part, an operating voltage value corresponding to the present output power of the power generator is calculated on the basis of the approximate function, and it is judged whether an absolute value of a difference between the calculated operating voltage value and the present operating voltage value is within a specified threshold or not, wherein when it is judged that the absolute value of the difference between the operating voltage values is within the specified threshold, it is recognized that the power point related to the output power that corresponds to the output level of the power generator has reached proximate of the maximum power point. With this arrangement of using an approximate function, the follow-up time for making the power point reach proximate of the maximum power point can be remarkably shortened so that follow-up to the maximum power point can be rapidly performed also when the power generator is a dynamic type power generator or the like in which changes in maximum power points with respect to changes in dynamics are large, and it is accordingly possible to improve the power generation efficiency.

According to the maximum power follow-up control apparatus of the present invention, the operating voltage value of the power converter is set to make the power point related to the output power of the power generator reach the maximum power point by utilizing a hill-climbing method for maximum power follow-up control when it has been recognized that the power point related to the output power that corresponds to the output level of the power generator has reached proximate of the maximum power point. With this arrangement, it is possible to improve the follow-up accuracy to the maximum power point by using the hill-climbing method for the follow-up operations from proximate of the maximum power point to the maximum power point.

According to the maximum power follow-up control apparatus of the present invention, when it is judged that the absolute value of the difference between the operating voltage values is not within the specified threshold, operations of the voltage value calculating part, the voltage value setting part and the judging part are continued until the absolute value of the difference between the operating voltage values falls within the specified threshold. With this arrangement, it is possible to rapidly follow up to proximate of the maximum power point.

According to the maximum power follow-up control apparatus of the present invention, a maximum power point is detected for each output level of the power generator and in that the approximate function is created on the basis of at least two maximum power points. With this arrangement, it is possible to easily create an approximate function and to further create an approximate function of high accuracy by increasing the number of samples of maximum power points.

According to the maximum power follow-up control apparatus of the present invention, the maximum power points for creating an approximate function are detected through the hill-climbing method, it is possible to create an approximate function of high accuracy.

According to the maximum power follow-up control apparatus of the present invention, abnormality of the power generator is noticed when it is judged that the approximate function created in the first approximate function creating part is abnormal, for instance, when the slope of the approximate function is reversed. With this arrangement, it is possible to notice the user of an abnormality of the power generator or of the approximate function.

According to the maximum power follow-up control apparatus of the present invention, the output power is divided into a plurality of level regions and average values of the plurality of power points separated into respective level regions are set as maximum power points, and in that the approximate function is created on the basis of the maximum power points for each of the level regions. With this arrangement, a plurality of power points, that is, a large number of samples, can be obtained and by averaging this number of samples, it is possible to create an approximate function of high accuracy corresponding to changes in external environments.

According to the maximum power follow-up control apparatus of the present invention, the maximum power point for creating an approximate function is detected by utilizing the hill-climbing method so that it is possible to create an approximate function of high accuracy.

According to the maximum power follow-up control apparatus of the present invention, abnormality of the power generator is noticed when it is judged that the that the approximate function as created in the second approximate function creating part is abnormal, for instance, when the slope of the approximate function is abnormal. With this arrangement, it is possible to notice the user of an abnormality of the power generator or of the approximate function.

According to the maximum power follow-up control apparatus of the present invention, approximate functions corresponding to types of the power generator are preliminarily stored so that it is possible to correspond to various power generators.

According to the maximum power follow-up control apparatus of the present invention, a maximum power point is detected by using the hill-climbing method and in that the approximate functions as stored to correspond to each type of the power generator are corrected on the basis of the detected maximum power point. With this arrangement, it is possible to create an approximate function of high accuracy corresponding to various changes in dynamics of the power generator and changes in illumination.

According to the maximum power follow-up control apparatus of the present invention, the maximum power point is detected by using the hill-climbing method when it has been recognized that the power point has reached proximate of the maximum power point and the approximate functions as being stored in the approximate function storing part are corrected on the basis of the detected maximum power point. With this arrangement, it is possible to continuously secure an approximate function of high accuracy corresponding to various changes in dynamics of the power generator and changes in illumination.

According to the maximum power follow-up control apparatus of the present invention, a follow-up operation to the maximum power point is executed by using the hill-climbing method when it has been recognized that the power point has reached proximate of the maximum power point, and only an intercept of the approximate function is corrected without changing its slope on the basis of the power point as detected by the follow-up operation. With this arrangement, it is possible to finely adjust errors in the approximate function.

What is claimed is:

1. A maximum power follow-up control apparatus for setting an operating voltage of a power converter that converts an output voltage of a power generator into AC power so as to make a power point of an output power of the power generator, which corresponds to an output level of the power generator, follow-up with a maximum power point, the maximum power follow-up control apparatus comprising:

an approximate function storing part that stores an approximate function related to a maximum power point corresponding to the output level of the power generator according to characteristics of the output power and the operating voltage; and a control part that calculates an operating voltage value corresponding to the present output power on the basis of the approximate function as stored in the approximate function storing part and that sets the calculated operating voltage value as an operating voltage value of the power converter in order to make the power point related to the output power in correspondence with the output level of the power generator follow up with the maximum power point.

2. The maximum power follow-up control apparatus according to claim 1, wherein the control part comprises:

a voltage value calculating part that calculates an operating voltage value corresponding to the present output power of the power generator on the basis of the approximate function, a voltage value setting part that sets the operating voltage value as calculated by the voltage value calculating part as an operating voltage value of the power converter, and a judging part that calculates an operating voltage value corresponding to the present output power in the voltage value calculating part upon setting the operating voltage value in the voltage value setting part and that judges whether an absolute value of a difference between the calculated operating voltage value and the present operating voltage value is within a specified threshold or not, wherein when it is judged by the judging part that the absolute value of the difference between the operating voltage values is within the specified threshold, it is recognized that the power point related to the output power that corresponds to the output level of the power generator has reached proximate of the maximum power point.

3. The maximum power follow-up control apparatus according to claim 2, wherein the control part is arranged in that the operating voltage value of the power converter is set to make the power point related to the output power of the power generator reach the maximum power point by utilizing a hill-climbing method for maximum power follow-up control when it has been recognized that the power point related to the output power that corresponds to the output level of the power generator has reached proximate of the maximum power point.

4. The maximum power follow-up control apparatus according to claim 2, wherein the control part is arranged in that, when it is judged by the judging part that the absolute value of the difference between the operating voltage values is not within the specified threshold, the operating voltage value is calculated in the voltage value calculating part, the calculated operating voltage value is set in the voltage value setting part, and operations of the voltage value calculating part, the voltage value setting part and the judging part are continued until the absolute value of the difference between the operating voltage values falls within the specified threshold in the judging part.

5. A maximum power follow-up control apparatus for setting an operating voltage of a power converter that converts an output voltage of a power generator into AC power so as to make a power point of an output power of the power generator, which corresponds to an output level of the power generator, follow up with a maximum power point, the maximum power follow-up control apparatus comprising:

an approximate function storing part that stores an approximate function related to a maximum power point corresponding to the output level of the power generator according to characteristics of the output power and the operating voltage;

a control part that calculates an operating voltage value corresponding to the present output power on the basis of the approximate function as stored in the approximate function storing part and that sets the calculated operating voltage value as an operating voltage value of the power converter in order to make the power point related to the output power in correspondence with the output level of the power generator follow up with the maximum power point; and a first approximate function creating part that detects a maximum power point for each output level of the power generator and that creates the approximate function on the basis of at least two maximum power points.

6. The maximum power follow-up control apparatus according to claim 5, wherein the first approximate function creating part detects the maximum power point of each output level of the power generator by utilizing a hill-climbing method for maximum power follow-up control.

7. The maximum power follow-up control apparatus according to claim 6, further comprising an abnormality noticing part that notices an abnormality of the power generator when it is judged that the approximate function created in the first approximate function creating part is abnormal.

8. A maximum power follow-up control apparatus for setting an operating voltage of a power converter that converts an output voltage of a power generator into AC power so as to make a power point of an output power of the power generator, which corresponds to an output level of the power generator, follow up with a maximum power point, the maximum power follow-up control apparatus comprising:

an approximate function storing part that stores an approximate function related to a maximum power point corresponding to the output level of the power generator according to characteristics of the output power and the operating voltage;

a control part that calculates an operating voltage value corresponding to the present output power on the basis of the approximate function as stored in the approximate function storing part and that sets the calculated operating voltage value as an operating voltage value of the power converter in order to make the power point related to the output power in correspondence with the output level of the power generator follow up with the maximum power point; and a second approximate function creating part that separates, by dividing the output power into a plurality of level regions and by sequentially detecting power points, the detected plurality of power points into respective level regions, that calculates average values of the plurality of power points separated into respective level regions for setting the average values of each of the level regions as maximum power points, and that creates the approximate function on the basis of the maximum power points for each of the level regions.

9. The maximum power follow-up control apparatus according to claim 8, wherein the second approximate function creating part detects the power points by utilizing a hill-climbing method for maximum power follow-up control.

10. The maximum power follow-up control apparatus according to claim 9, further comprising an abnormality noticing part that notices an abnormality of the power generator when it is judged that the approximate function created in the second approximate function creating part is abnormal.

11. The maximum power follow-up control apparatus according to claim 1, wherein the approximate function storing part is arranged to preliminarily store approximate functions corresponding to types of the power generator.

12. The maximum power follow-up control apparatus according to claim 11, further comprising a first approximate function correcting part that detects a maximum power point for each output level of the power generator by using a hill-climbing method for maximum power follow-up control and that corrects the approximate functions as stored to correspond to each type of the power generator on the basis of the detected maximum power point.

13. The maximum power follow-up control apparatus according to claim 2, further comprising a second approximate function correcting part that detects a maximum power point for each output level of the power generator by using a hill-climbing method for maximum power follow-up control when it has been recognized that the power point related to the output power that corresponds to the output level of the power generator has reached proximate of the maximum power point, and that corrects the approximate functions as being stored in the approximate function storing part on the basis of the detected maximum power points.

14. The maximum power follow-up control apparatus according to claim 2, further comprising a third approximate function correcting part that executes follow-up operations to the maximum power point by using a hill-climbing method for maximum power follow-up control when it has been recognized that the power point related to the output power that corresponds to the output level of the power generator has reached proximate of the maximum power point, and that corrects only an intercept of the approximate function without changing its slope on the basis of the power point as detected by the follow-up operation.

* * * * *

UNITED STATES PATENT AND TRADEMARK OFFICE

CERTIFICATE OF CORRECTION

PATENT NO. : 7,045,991 B2 
APPLICATION NO. : 10/796290
DATED : May 16, 2006
INVENTOR(S) : Kotaro Nakamura et al.

It is certified that error appears in the above-identified patent and that said Letters Patent is hereby corrected as shown below:

ON THE TITLE PAGE OF PATENT:

(73) Assignee: Delete “Omron Coproration” and replace it with --Omron Corporation--.

Signed and Sealed this

Tenth Day of October, 2006

JON W. DUDAS
*Director of the United States Patent and Trademark Office*